(12) United States Patent
Kim et al.

(10) Patent No.: US 7,336,641 B2
(45) Date of Patent: Feb. 26, 2008

(54) METHOD AND APPARATUS FOR PROVIDING MUTUAL TIME DIFFERENCE DETERMINATION OF BASE STATION SIGNALS IN A CELLULAR COMMUNICATION SYSTEM

(75) Inventors: Hyung-Jun Kim, Seongnam-si (KR); Eun-Tae Won, Seoul (KR); Alexandr Vasilievich Garmov, Voronezh (RU); Andrew Yurievich Savinkov, Voronezh (RU); Stanislav Anatolievich Filin, Voronezh (RU)

(73) Assignee: Samsung Electronics Co., Ltd., Suwon-si, Geonggi-do (KR)

( * ) Notice: Subject to any disclaimer, the term of this patent is extended or adjusted under 35 U.S.C. 154(b) by 879 days.

(21) Appl. No.: 10/712,403

(22) Filed: Nov. 14, 2003

(65) Prior Publication Data

US 2004/0151152 A1    Aug. 5, 2004

(30) Foreign Application Priority Data

Nov. 15, 2002   (RU) .............................. 2002130594

(51) Int. Cl.
*H04B 7/216* (2006.01)
(52) U.S. Cl. ....................... 370/342; 370/238
(58) Field of Classification Search ................ None
See application file for complete search history.

(56) References Cited

U.S. PATENT DOCUMENTS

| | | | |
|---|---|---|---|
| 6,034,635 A * | 3/2000 | Gilhousen | 342/457 |
| 2003/0007470 A1* | 1/2003 | Grilli et al. | 370/335 |
| 2003/0069033 A1* | 4/2003 | Edge et al. | 455/502 |
| 2005/0014516 A1* | 1/2005 | Rached et al. | 455/456.1 |
| 2005/0064876 A1* | 3/2005 | Ruutu et al. | 455/456.1 |
| 2007/0042790 A1* | 2/2007 | Mohi et al. | 455/456.5 |

* cited by examiner

*Primary Examiner*—Edan Orgad
*Assistant Examiner*—Blanche Wong
(74) *Attorney, Agent, or Firm*—Roylance, Abrams, Berdo & Goodman, L.L.P.

(57) ABSTRACT

A method and an apparatus for determining mutual time difference between base station signals in an asynchronous code division multiplexing access (CDMA) system. The method comprises the steps of: measuring mutual time difference of signals transmitted between at least two base stations; determining all possible paths between said at least two base stations; and providing weights to the measured mutual time difference for said all possible paths. The apparatus comprises: a location measurement unit for measuring mutual time difference of signals transmitted between at least two base stations; a mobile user location center for receiving the mutual time difference of the signals measured by the location measurement unit, determining all possible paths between said at least two base stations, and providing weights to the measured mutual time difference for said all possible paths. The method and apparatus can determine a mutual time difference of signals transmitted from base stations even when the signals are blocked by a certain object and can improve the determination accuracy of the mutual time difference of base station signals.

26 Claims, 12 Drawing Sheets

METHOD AND APPARATUS FOR PROVIDING MUTUAL TIME DIFFERENCE DETERMINATION OF BASE STATION SIGNALS IN A CELLULAR COMMUNICATION SYSTEM

PRIORITY

This application claims priority to an application entitled "Method of mutual time difference determination of base station signals in cellular communication system" filed in the Russian Industrial Property Office on Nov. 15, 2002 and assigned Serial No. RU2002130594, the contents of which are incorporated herein by reference.

BACKGROUND OF THE INVENTION

1. Field of the Invention

The present invention relates to a radio communication system, in particular to a method and an apparatus for providing mutual time difference determination of base station signals in a cellular communication system.

2. Description of the Related Art

Third Generation (3G) CDMA cellular base stations are non-synchronous in for example the Third Generation Partnership Project (3GPP) Frequency Division Duplex (FDD) mode. Here, the synchronism of base stations (BS) refers to the synchronization of the downlink transmission signals of different base stations.

Mutual time difference determination is required to determine the mobile users' locations and to reduce time and hardware resources at the initial base station signal search by mobile stations and to decrease the stored data amount in the course of the soft handoff procedure. The mutual time difference determination during the soft handoff procedure is described in the Russian patent #2137314, Int. cl.6 H 04 L 27/30, which is incorporated herein by reference.

One of the prior art solutions described in "Synergies Between Satellite Navigation and Location Services of Terrestrial Mobile Communication", G. Hein, B. Eissfeller, V. Oehler, Jon O. Winkel, Institute of Geodesy and Navigation, University FAF Munich, ION GPS 2000, 19-22 Sep. 2000, Salt Lake City, Utah, which is incorporated herein by reference proposes the application of location measurement units receiving BS signals and defining the BS their mutual time difference to determine mutual time differences of base stations.

However, the disclosed solution described above has the following problems:

First, non-line of sight multipath signal propagation from base stations to location measurement units causes low accuracy when determining mutual time differences of base station signals.

Second, it is impossible to get the mutual time difference of the base station signals when the direct measurement is unobtainable.

The prior art solution to overcome such problems is the solution described in 3GPP Technical Specification (TS) 25.305 V3.7.0, 2001 12, "Stage 2 Functional Specification of UE Positioning in UTRAN", which is incorporated herein by reference.

This solution proposes to receive base station signals, from which the mutual time difference is determined by the location measurement unit which is located in a position with known coordinates. FIG. 1 helps in understanding the method of mutual time difference determination of base station signals in a cellular communication system performed by 3GPP TS 25.305 V3.7.0, 2001 12.

FIG. 1 shows base stations 1 and 2, the mutual time difference of which is to be determined, a location measurement unit (LMU) 3, base station controller (BSC) 4 and a mobile user location center (MULC) 5.

The LMU 3 receives a signal of the base station (BS) 1 and a signal of the BS 2 and executes a specified number of sequential measurements of the signals' time difference. Further, the LMU 3 averages the sequential measurements of time difference of BS 1 and BS 2 signals, thus obtaining the averaged measured time difference of the signals of the given base stations.

The LMU 3 determines the accuracy of the averaged measured time difference, for example, by the signal-to-noise ratio of the BS 1 and BS 2. In this case a value linearly connected with an error of the averaged measured time difference to the true value of the time difference of the BS 1 and 2 signals received by the location measurement unit 3 is selected as the averaged measured time difference accuracy.

The averaged measured time difference of the BS 1 and BS 2 signals and its accuracy are transmitted from the LMU 3 to the BS 1 or BS 2 using the current radio interface and then transmitted from the respective BS to the base station controller 4 by a wire communication line connecting the BSC 4 and the base station.

The BSC 4 determines the mutual time difference of the BS 1 and BS 2 signals by the averaged measured time difference of the BS 1 and BS 2 signals by considering the known mutual location of the BS 1 and BS 2 and the LMU 3.

The obtained mutual time difference of the BS 1 and BS 2 signals and its accuracy are transmitted from the BSC 4 to the mobile user location center 5 for further application.

Thus, the following main features of implementing the method can be emphasized from the description of the prior art method of mutual time difference determination of base station signals in a cellular communication system:

In each location, a measurement unit performs the sequential measurement of mutual time difference of signals of at least two base stations, signals of which are received in the location measurement unit, averaging of these time difference measurements results in the averaged measured mutual time difference of these base stations, and determines its accuracy.

The averaged measured time differences and their accuracies are transmitted from each location measurement unit to one of the base stations which signals are received by the location measurement unit, and then to the base station controller that controls the base station.

The mutual time difference of signals is determined for each base station pair for the base station controller using the averaged measured time difference of the given base station signals.

However, the known method has a number of important disadvantages.

First, determination of the mutual time difference of the base station signals by the averaged measured time difference of these base station signals may be insignificantly accurate. The inaccuracy is caused by the fact that the estimate of the mutual time difference of the base station signals is subject to the impact of noise errors, intra-system interference and multipath errors.

The difference between the delays of line of sight base station signals propagation to the location measurement unit can be removed with the use of the known coordinates of the base stations and location measurement unit.

When $\Delta t_{1\to 2}$ is marked as an estimate of the mutual time difference of signals of the base station pair, especially the signals of the first BS to the signal of the second BS, and $\Delta \tilde{t}_{1\to 2}$ is marked as the true value of the mutual time difference of signals of the base stations, the difference between the estimate $\Delta t_{1\to 2}$ and the true value $\Delta \tilde{t}_{1\to 2}$ can be expressed by the following Equation 1.

$$\Delta t_{1\to 2} - \Delta \tilde{t}_{1\to 2} = \epsilon_{noise} + \epsilon_{multipath,1} - \epsilon_{multipath,2} \quad \text{Equation 1}$$

In equation 1, $\epsilon_{noise}$ is an error defined by noise and intra-system interference, $\epsilon_{multipath,1}$ is a multipath error of the first BS, equal to the difference between the real propagation time of the first BS signal to the location measurement unit and the known propagation time of the first BS signal to the location measurement unit, and $\epsilon_{multipath,2}$ is a multipath error of the second BS, equal to the difference between the real propagation time of the second BS signal to the location measurement unit and the known propagation time of the second BS signal to the location measurement unit.

The averaging of the estimate $\Delta t_{1\to 2}$ of the mutual time difference of signals of the first BS and second BS in the location measurement unit results in the reduction of the noise error value $\epsilon_{noise}$. The multipath error difference $\epsilon_{multipath,1} - \epsilon_{multipath,2}$ is invariable since it is defined by the mutual location of the first and second BS and the location measurement unit and the surrounding scattering objects (buildings, mountains, hills, etc.) as well.

Hence, the accuracy of the claimed method of mutual time difference determination of base station signals in a cellular communication system may be insufficient for a location.

Second, there may be a situation when there is no direct time signal difference measurement between any base stations, even when their mutual time difference is required.

FIG. 2 illustrates the above situation, demonstrating the base stations 6, 7 and 8, location measurement units 9 and 10 and a building 11. Each of the BS 6, BS 7 and BS 8 transmits the first and second signals which comprise a group signal.

The base station group signal refers to a signal transmitted from the base station and having the Synchronization CHannel (SCH), Common PIlot Channel (CPICH) and Primary Common Control Physical CHannel (P-CCPCH) and other channels as well.

Each of the LMU 9 and the LMU 10 receives signals transmitted from surrounding base stations and measures the signals time difference.

Referring to FIG. 2, the LMU 9 receives the first signals of the BS 6 and BS 7 and measures their time difference. The LMU 10 receives the second signal of the BS 7 and the first signal of the BS 8 and measures their time difference.

However, the second signal of the BS 6 is held by the building 11 and cannot be received by the LMU 10. The second signal of the BS 8 is also held by the building 11 and cannot be received by the LMU 9.

When the direct measurement of the time difference of the signals of the BS 6 and BS 8 cannot be performed as described above, the conventional methods do not propose any solution capable of determining the mutual time difference between the signals of the BS 6 and BS 8.

SUMMARY OF THE INVENTION

Accordingly, the present invention has been made to solve the above-mentioned problems occurring in the prior art, and an object of the present invention is to provide a method and an apparatus which can determine a mutual time difference of signals transmitted from base stations even when the signals are blocked by a certain object.

It is another object of the present invention is to provide a method and an apparatus which can improve the determination accuracy of the mutual time difference of base station signals.

In order to substantially accomplish this object, there is provided a method for determining mutual time difference between base station signals in an asynchronous code division multiplexing access (CDMA) system, the method comprising the steps of: measuring mutual time difference of signals transmitted between at least two base stations; determining all possible paths between said at least two base stations; and providing weights to the measured mutual time difference for said all possible paths.

In accordance with another aspect of the present invention, there is provided an apparatus for determining mutual time difference between base station signals in an asynchronous code division multiplexing access (CDMA) system, the apparatus comprising: a location measurement unit for measuring mutual time difference of signals transmitted between at least two base stations; a mobile user location center for receiving the mutual time difference of the signals measured by the location measurement unit, determining all possible paths between said at least two base stations, and providing weights to the measured mutual time difference for said all possible paths.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Embodiments of the present invention will be described with reference to the accompanying drawings. In the following description of the present invention, a detailed description of known functions and configurations incorporated herein will be omitted for conciseness.

In acquiring more precise time difference information between base stations for measurement of locations in an asynchronous mobile communication system, in which no synchronization is made between the mobile stations, the embodiment of the present invention provides a method that is capable of utilizing mutual time difference information between various base stations, so as to reduce error in the time difference information which may be caused when a first and second base stations forming a pair among the various base stations are located in a downtown area in which propagation delay may frequently happen. It should be noted that the embodiment of the present is not limited to base stations in downtown areas, the base stations can be used in an environment where signals can be blocked or affected by physical objects.

In order to help in understanding the embodiment of the present invention, an example of the method of mutual time difference determination of base station signals in a cellular communication system proposed by the present invention will be described with reference to FIGS. 3 to 6.

Figure 1:
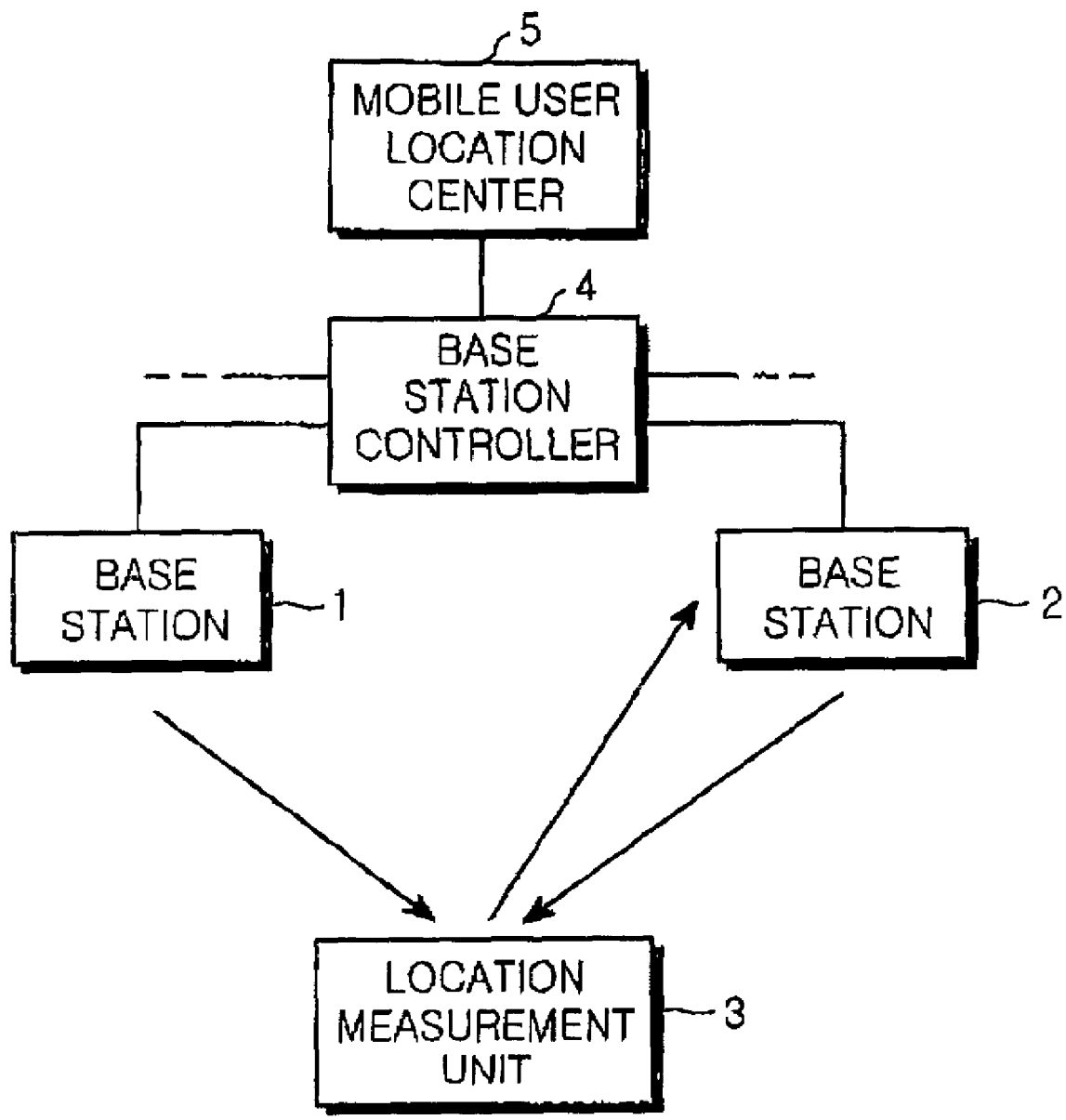
FIG. 1 is a block diagram illustrating an example of a positioning system according to a Third Generation Partnership Project Technical Specification (3GPP TS) 25.305 V3.7.0, 2001 12, "Stage 2 Functional Specification of User Equipment (UE) Positioning in Universal Mobile Telecommunications System Terrestrial Radio Access Network (UT-RAN)"
Figure 2:
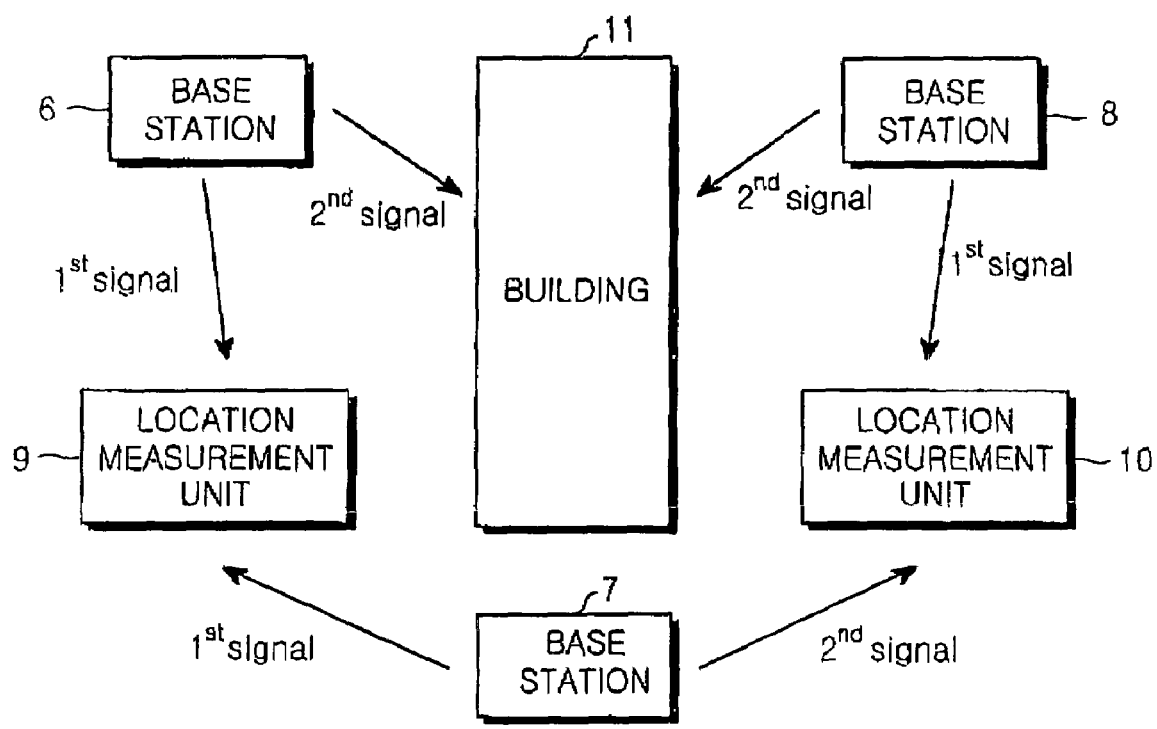
FIG. 2 is a block diagram illustrating an example of an arrangement of base stations, location measurement units and buildings when there is no direct measurement of the time difference of base station signals.
Figure 3:
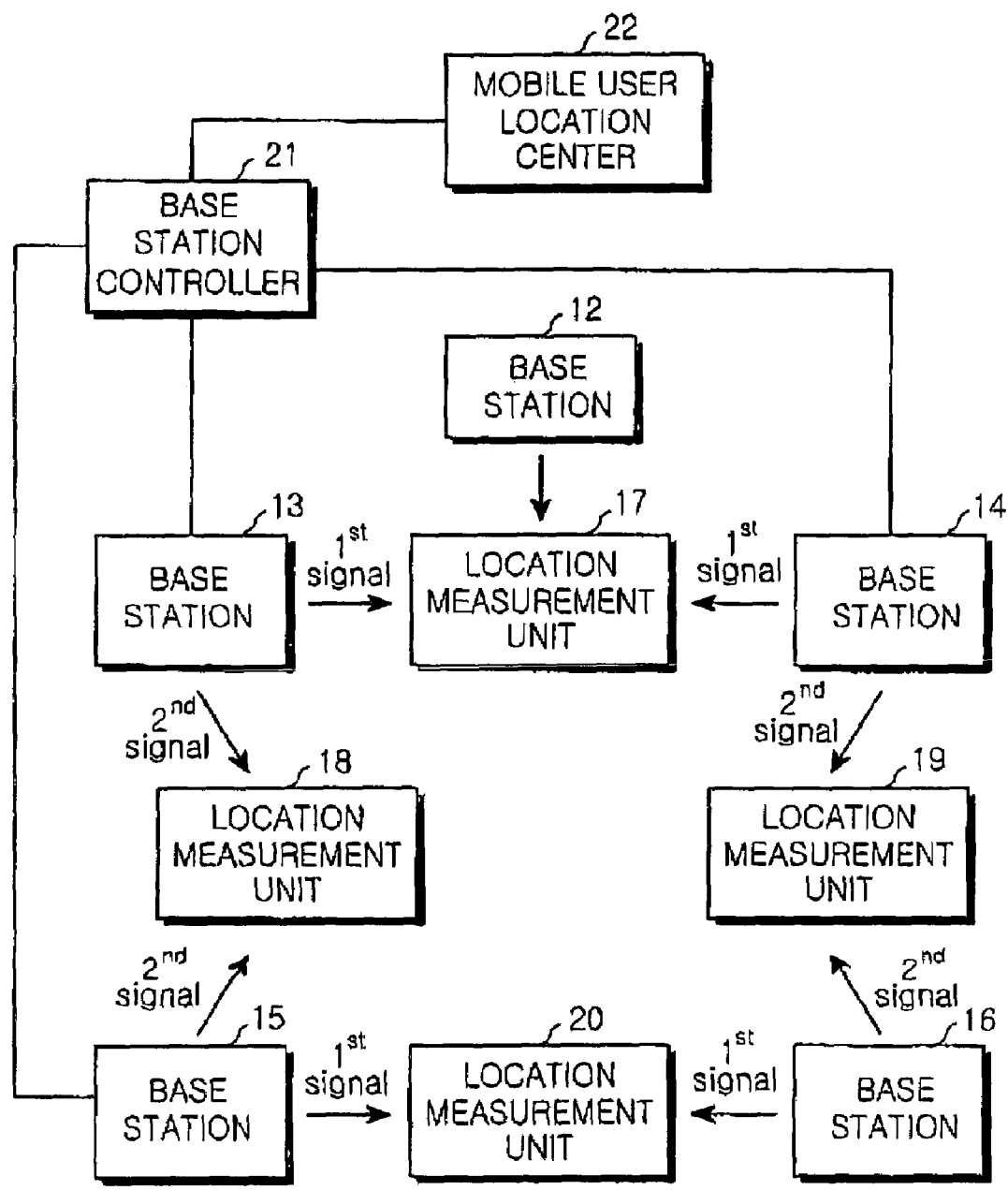
FIG. 3 is a block diagram illustrating an example of a radio communication system in accordance with an embodiment of the present invention.

FIG. 3 is a block diagram illustrating an example of a radio communication system in accordance with an embodiment of the present invention.

Referring to FIG. 3, the cellular radio communication system includes a plurality of base stations (BSs) 12, 13, 14, 15 and 16, location measurement units (LMUs) 17, 18, 19 and 20 for receiving at least two base station signals from the BSs 12, 13, 14, 15 and 16 through a radio interface, a base station controller (BSC) 21 connected through wire communication lines to the BSs 12, 13, 14, 15 and 16 to control the BSs 12, 13, 14, 15 and 16, and a mobile user location center (MULC) 22 connected to the BSC 21 through a wire communication line. The (MULC) 22 could be embedded in the BSC 21.

The BS 12 transmits a signal being its group signal. The BS 13 transmits the first and second signals being its group signal. The BS 14 transmits the first and second signals being its group signal. The BS 15 transmits the first and second signals being its group signal. The BS 16 transmits the first and second signals being its group signal.

The base station group signal refers to a signal transmitted from the base station comprising the following channels: Synchronization CHannel (SCH), Common PIlot Channel (CPICH), Primary Common Control Physical CHannel (P-CCPCH) and other channels as well.

The LMU 17 receives the signal of the BS 12 and the first signal of the BS 13, and executes sequential measurements of the time difference of the first signal of the BS 13 relating to the signal of the BS 12. These time difference measurements are averaged, thus obtaining the averaged measured time difference $\Delta t_{13->12,17}$ of the first signal of the BS 13 regarding the BS 12 signal. Its accuracy $\sigma_{13->12,17}$ is determined.

The LMU 17 also receives the first signal of the BS 13 and the first signal of the BS 14, and executes sequential measurements of the time difference of the first signal of the BS 13 relating to the signal of the BS 14. These time difference measurements are averaged, thus obtaining the averaged measured time difference $\Delta t_{13->14,17}$ of the first signal of the BS 13 with regard to the first signal of the BS 14. Its accuracy $\sigma_{13->14,17}$ is determined.

The LMU 17 also receives the first signal of the BS 12 and the first signal of the BS 14, and performs sequential measurements of the time difference of the BS 12 signal with respect to the first signal of the BS 14. These time difference measurements are averaged, thus obtaining the averaged measured time difference $\Delta t_{12->14,17}$ of the BS 12 signal with respect to the first signal of the BS 14. Its accuracy $\sigma_{12->14,17}$ is determined.

The LMU 20 receives the first signals of the BS 15 and BS 16, and performs sequential measurements of the time difference of the first signal of the BS 16 with respect to the first signal of the BS 15. These time difference measurements are averaged, thus obtaining the averaged measured time difference $\Delta t_{16->15,20}$ of the first signal of the BS 16 with respect to the first signal of the BS 15. Its accuracy $\sigma_{16->15,20}$ is determined.

The LMU 18 receives the second signals of the BS 13 and BS 15, executes sequential measurements of the time difference of the second signal of the BS 15 with respect to the second signal of the BS 13. These time difference measurements are averaged, thus obtaining the averaged measured time difference $\Delta t_{15->13,18}$ of the second signal of the BS 15 with respect to the second signal of the BS 13, and its accuracy $\sigma_{15->13,18}$ is determined.

The LMU 19 receives the second signals of the BS 14 and BS 16, performs sequential measurements of the time difference of the second signal of the BS 14 with respect to the second signal of the BS 16, averages these time difference measurements, thus obtaining the averaged measured time difference $\Delta t_{14->16,19}$ of the second signal of the BS 14 with respect to the second signal of the BS 16. Its accuracy $\sigma_{14->16,19}$ is determined.

To illustrate, a process of obtaining the averaged time difference $\Delta t_{14->16,19}$ of the second signal of the BS 14 with respect to the second signal of the BS 16 and determining its accuracy $\sigma_{14->16,19}$ will be explained below with reference to FIG. 4.

Herein, the radio communication system is assumed to be the 3GPP system in the Frequency Division Duplex (FDD) mode. Base stations of the system transmit signals containing SCH, CPICH and P-CCPCH.

Figure 4:
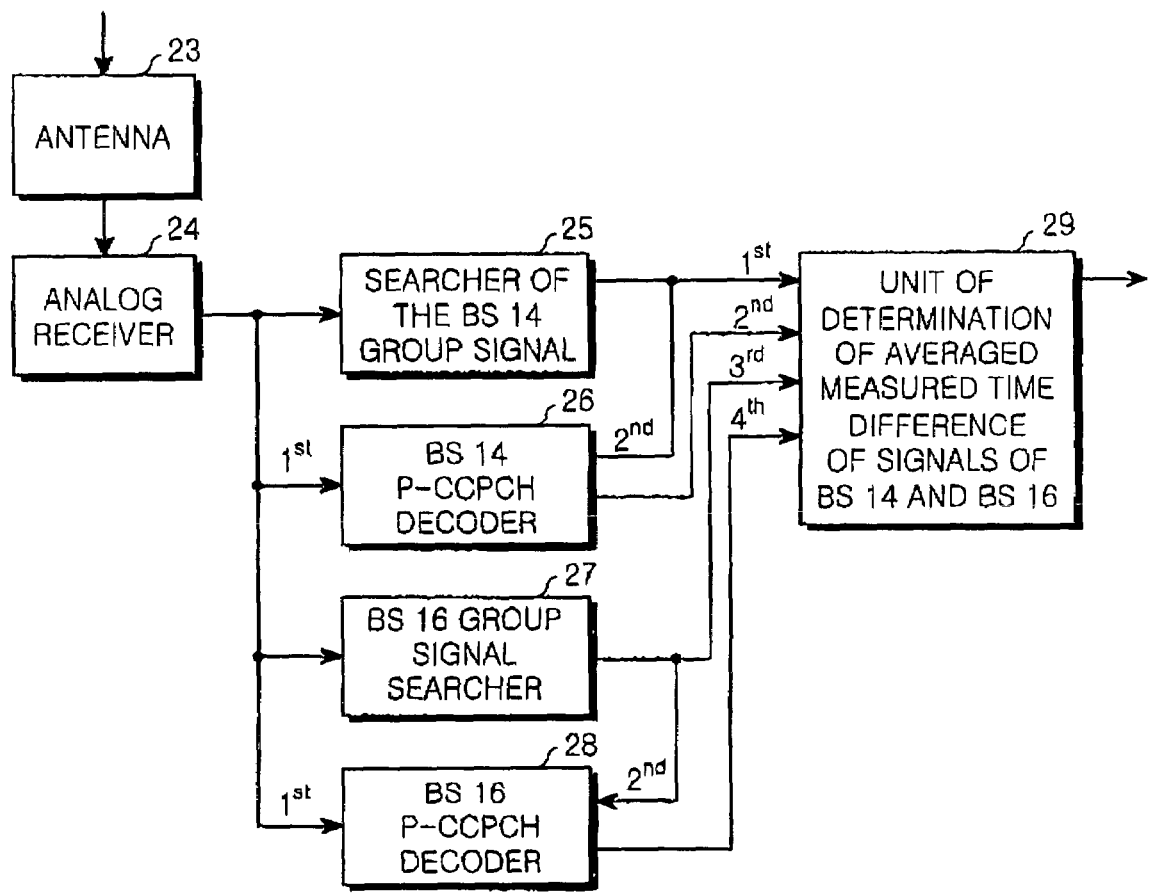
FIG. 4 is a block diagram illustrating an example of a location measurement unit for determining the averaged measured time difference of base station signals in accordance with an embodiment of the present invention.

FIG. 4 is a block diagram illustrating an example of a location measurement unit for determining the averaged measured time difference of base station signals in accordance with an embodiment of the present invention.

Referring to FIG. 4, the location measurement unit for determination of the averaged time difference of signals of the BS 14 and BS 16 comprises an antenna 23, analog receiver 24, searcher 25 of the BS 14 group signal (hereinafter referred to as searcher 25), decoder 26 of the Primary Common Control Physical Channel of the BS 14 (hereinafter referred to as decoder 26), searcher 27 of the BS 16 group signal (hereinafter referred to as searcher 27), decoder 28 of the Primary Common Control Physical Channel of the BS 16 (hereinafter referred to as decoder 28) and a unit 29 of determination of the averaged measured time difference of signals of the BS 14 and 16 (hereinafter referred to as unit 29), wherein the input of the antenna 23 is the input of the location measurement unit, the output of the antenna 23 is connected to the input of the analog receiver 24, the output of which is linked to the inputs of the searcher 25 and the searcher 27 and to the first inputs of the decoder 26 and decoder 28, the output of the searcher 25 is connected to the first input of the unit 29 and to the second input of the decoder 26, the output of which is connected to the second input of the unit 29, the output of the searcher 27 is connected to the third input of the unit 29 and to the second input of the decoder 28, the output of which is connected to the fourth input of the unit 29, the output of which is the output of the location measurement unit.

In this case, the analog receiver can be embodied in the manner provided in the U.S. Pat. No. 5,103,459 titled "System and Method for Generating Signal Waveforms in a CDMA Cellular Telephone System", Int. C1.5H 04 L 27/30, the contents of which is incorporated herein by reference.

The searcher 25 and the searcher 27 can be embodied in the manner described in 3GPP TS 25.214 V3.9.0 (2001-12), Physical layer procedures (FDD), Annex C: Cell search procedure and in "Cell Search in W-CDMA", Yi-Pin Eric Wang and Tony Ottosson, IEEE JOURNAL ON SELECTED AREAS IN COMMUNICATIONS, VOL. 18, NO. 8, AUGUST 2000, the contents of which is incorporated herein by reference.

The decoder 26 and the decoder 28 can be embodied like the coherent RAKE receivers of Sadayuki ABETA, Mamoru SAWAHASHI, and Fumiyuki ADACHI, "Performance Comparison between Time-Miltiplexed Pilot Channel and Parallel Pilot Channel for Coherent Rake Combining in DS-CDMA Mobile Radio", IEICE Trans. Commun., Vol. E81-B, No. 7, July 1998, the contents of which is incorporated herein by reference.

An input signal of the location measurement unit containing BS 14 and BS 16 group signals is applied to the input of the antenna 23 and is applied from the output of antenna 23 to the input of the analog receiver 24. The signal is transmitted from the output of the analog receiver 24 to the inputs of the searcher 25 and searcher 27 and to the first inputs of the decoder 26 and the decoder 28. The searcher 25 searches the group signal of the BS 14 in the searching window using 38400 chips with the Synchronization Channel and Common Pilot Channel. A signal of the BS 14 is assumed to be acquired in the position $P_1$. Additionally, the searcher 25 determines the number of the primary scrambling code of the BS 14. A signal containing the values of the acquired time position $P_1$ of the BS 14 signal is applied from the output of the searcher 25 to the first input of the unit 29 and to the second input of the decoder 26. A signal containing the number of the primary scrambling code of the BS 14 is applied from the output of the searcher 25 to the second input of the decoder 26. With the obtained value of the acquired time position $P_1$ of the BS 14 signal and the obtained number of the primary scrambling code of the BS 14 the decoder 26 de-scrambles, demodulates and decodes the Primary Common Control Physical Channel, thus obtaining the value of the System Frame Number (SFN) of the BS 14 at the moment of the transmission of the first chip of this frame. This SFN value of the BS 14 is labeled by $SFN_1$. A signal containing the determined value $SFN_1$ of the SFN of the BS 14 is applied from the output of the decoder 26 to the second input of the unit 29.

The searcher 27 searches the group signal of the BS 16 within the searching window using 38400 chips with the Synchronization Channel and Common Pilot Channel. It is assumed that the BS 16 signal is acquired in the position $P_2$. Additionally, the searcher 27 determines the number of the primary scrambling code of the BS 16. A signal containing the value of the acquired time position $P_2$ of the BS 16 signal is applied from the output of the searcher 27 to the third input of the unit 29 and to the second input of the decoder 28. A signal containing the number of the primary scrambling code of the BS 16 is applied from the output of the searcher 27 to the second input of the decoder 28. With the obtained value of the acquired time position $P_2$ of the BS 16 signal and the obtained number of the primary scrambling code of the BS 16 the decoder 28 de-scrambles, demodulates and decodes the Primary Common Control Physical Channel, thus obtaining the value of the SFN of the BS 16 at the moment of the transmission of the first chip of this frame. This SFN value of the BS 16 is labeled by $SFN_2$. A signal containing the determined value $SFN_2$ of the SFN of the BS 16 is applied from the output of the decoder 28 to the fourth input of the unit 29.

The unit 29 defines the measured time difference $\Delta t_{14 \to 16,19}$ of the BS 14 signal with respect to the BS 16 signal using the following equation 2.

$$\Delta t_{14 \to 16,19} = (SFN_1 - SFN_2)T_{fr} + (P_1 - P_2)T_{ch} \qquad \text{Equation 2}$$

In equation 2, $T_{fr}$—length of a frame of 3GPP base station signal of 10 ms, and $T_{ch}$—length of one chip of $1/(3.84 \cdot 10^6)$ s or around 260 ns.

The unit 29 averages, for example, some sequentially measured time differences of the BS 14 signal with respect to the BS 16 signal obtained by equation 2, thus obtaining the averaged measured time difference $\Delta t_{14 \to 16,19}$ of the signal of the BS 14 with respect to the signal of the BS 16. The unit 29 can be implemented on the Digital Signal Processor (DSP) using the above algorithm.

If all location measurement units determine the averaged measured time differences of base station signals in a similar manner with the same number of averages, the accuracies of all averaged measured time differences of base station signals can be defined to be the same and equal to 100 ns, for example.

In a general case with more complex and more accurate determination methods of the averaged measured time differences of base station signals or with different number of averages in different location measurement units, the accuracies of different averaged measured time differences of base station signals are different and depend on, for example, signal-to-noise ratios of signals, which averaged measured time difference to be determined, and/or number of averages.

The averaged measured time differences $\Delta t_{13 \to 12,17}$, $\Delta t_{13 \to 14,17}$ and $\Delta t_{12 \to 14,17}$ and their accuracies $\sigma_{13 \to 12,17}$, $\sigma_{13 \to 14,17}$ and $\sigma_{12 \to 14,17}$ are transmitted from the LMU 17 to the BS 13 and then to the BSC 21.

The averaged measured time difference $\Delta t_{15->13,18}$ and its accuracy $\sigma_{15->13,18}$ are transmitted from the LMU 18 to the BS 13 and then to the BSC 21.

The averaged measured time difference $\Delta t_{14->16,19}$ and its accuracy $\sigma_{14->16,19}$ are transmitted from the LMU 19 to the BS 14 and then to the BSC 21.

The averaged measured time difference $\Delta t_{16->15,20}$ and its accuracy $\sigma_{16->15,20}$ are transmitted from the LMU 20 to the BS 15 and then to the BSC 21.

As will be shown from the following equation 3, the known value of the difference of delays at line of sight signal propagation from the BS 13 and the BS 12 to the location measurement unit 17 is subtracted from the averaged measured time difference $\Delta t_{13->12,17}$ in the BS controller 21, thus obtaining the adjusted time difference $\Delta \tilde{t}_{13->12,17}$ of the signal of the BS 13 with respect to the signal of the BS 12.

$$\Delta \tilde{t}_{13->12,17} = \Delta t_{13->12,17} - (\tau_{13->17} - \tau_{12->17}) \quad \text{Equation 3}$$

In equation 3, $\tau_{13->17}$ is the signal propagation delay from the BS 13 to the location measurement unit 17 and $\tau_{12->17}$ is the signal propagation delay from the BS 12 to the location measurement unit 17. The signal propagation delays can be calculated using the following equation 4.

$$\tau_{12->17} = \frac{\sqrt{(x_{12}-x_{17})^2 + (y_{12}-y_{17})^2 + (z_{12}-z_{17})^2}}{c}, \quad \text{Equation 4}$$

$$\tau_{13->17} = \frac{\sqrt{(x_{13}-x_{17})^2 + (y_{13}-y_{17})^2 + (z_{13}-z_{17})^2}}{c}.$$

In equation 4, c is the light speed, the BS 12 coordinates with $x_{12}$, $y_{12}$, $z_{12}$, the BS 13 coordinates with $x_{13}$, $y_{13}$, $z_{13}$, and the location measurement unit 17 coordinates with $x_{17}$, $y_{17}$, $z_{17}$. The base stations and location measurement unit coordinates can be determined with the use of the Global Positioning System (GPS) and/or Global Navigation Satellite System (GNSS) receiver.

In this case, the accuracy of the adjusted time difference $\Delta \tilde{t}_{13->12,17}$ is equal to the accuracy of the adjusted averaged measured time difference $\Delta t_{13->12,17}$ and to $\sigma_{13->12,17}$.

The adjusted time difference $\Delta \tilde{t}_{13->14,17}$ of the signal of the BS 13 with respect to the signal of the BS 14, the adjusted time difference $\Delta \tilde{t}_{12->14,17}$ of the signal of the BS 12 with respect to the signal of the BS 14, the adjusted time difference $\Delta \tilde{t}_{15->13,18}$ of the signal of the BS 15 with respect to the signal of the BS 13, the adjusted time difference $\Delta \tilde{t}_{14->16,19}$ of the signal of the BS 14 with respect to the signal of the BS 16 and the adjusted time difference $\Delta \tilde{t}_{16->15,20}$ of the signal of the BS 16 with respect to the signal of the BS 15 are determined in the same manner.

The adjusted time differences $\Delta \tilde{t}_{13->12,17}$, $\Delta \tilde{t}_{13->14,17}$, $\Delta \tilde{t}_{12->14,17}$, $\Delta \tilde{t}_{15->13,18}$, $\Delta \tilde{t}_{14->16,19}$ and $\Delta \tilde{t}_{16->15,20}$ and their accuracies $\sigma_{13->12,17}$, $\sigma_{13->14,17}$, $\sigma_{12->14,17}$, $\sigma_{15->13,18}$, $\sigma_{14->16,19}$ and $\sigma_{16->15,20}$ are transmitted from the BSC 21 to the MULC 22.

Assume, the mutual time difference $\Delta \tilde{t}_{13->14}$ of the signal of the BS 13 with respect to the signal of the BS 14 should be determined by the MULC 22.

The true mutual time difference value of the signal of the BS 13 with respect to the signal of the base station 14 is marked by $\Delta t_{13->14}$, the true mutual time difference value of the signal of the BS 13 with respect to the signal of the BS 12 is marked by $\Delta t_{13->12}$, the true mutual time difference value of the signal of the BS 12 with respect to the signal of the BS 14 is marked by $\Delta t_{12->14}$, the true mutual time difference value of the signal of the BS 15 with respect to the signal of the BS 13 is marked by $\Delta t_{15->13}$, the true mutual time difference value of the signal of the BS 14 with respect to the signal of the BS 16 is marked by $\Delta t_{14->16}$ and the true mutual time difference value of the signal of the BS 16 with respect to the signal of the BS 15 is marked by $\Delta t_{16->15}$.

Since $\Delta t_{13->14} = \Delta t_{13->12} + \Delta t_{12->14}$ and $\Delta t_{13->14} = -\Delta t_{15->13} - \Delta t_{16->15} - \Delta t_{14->16}$, the mutual time difference $\Delta \tilde{t}_{13->14}$ can be estimated by three methods:

$$\Delta \tilde{t}_{13->14,17}$$

$$\Delta \tilde{t}_{13->12,17} + \Delta \tilde{t}_{12->14,17} \tilde{D}$$

$$-\Delta \tilde{t}_{15->13,18} - \Delta \tilde{t}_{16->15,20} - \Delta \tilde{t}_{14->16,19}.$$

Figure 5:
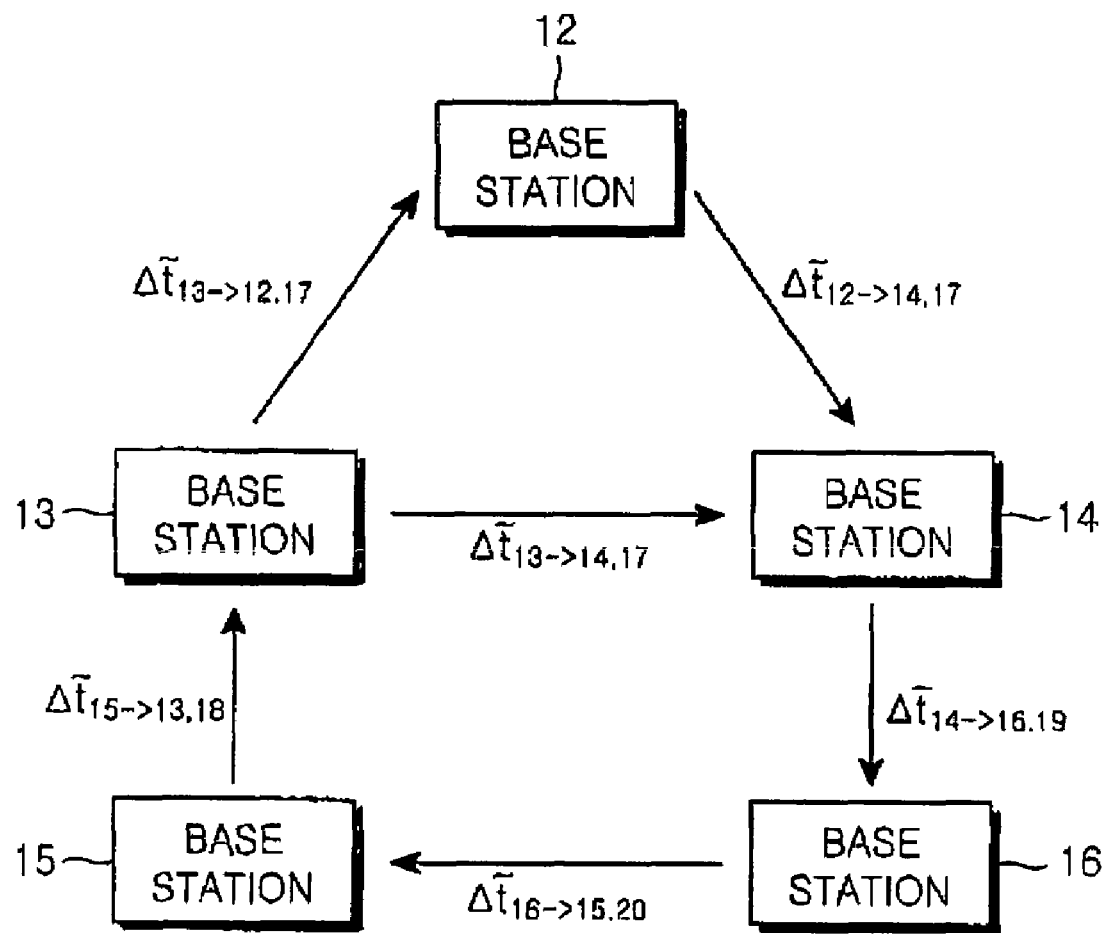
FIG. 5 is a block diagram illustrating an example of a radio communication system having base stations as the vertexes and the adjusted time differences of the base station signals as the arcs in accordance with an embodiment of the present invention.

The configuration composed of the BS 12 through BS 16 and the adjusted time differences $\Delta \tilde{t}_{13->12,17}$, $\Delta \tilde{t}_{13->14,17}$, $\Delta \tilde{t}_{12->14,17}$, $\Delta \tilde{t}_{15->13,18}$, $\Delta \tilde{t}_{14->16,19}$ and $\Delta \tilde{t}_{16->15,20}$ is presented in the form of a graph depicted in FIG. 5.

Referring to FIG. 5, the vertexes of the graph are the BS 12 through BS 16 and its arcs are the adjusted time differences $\Delta \tilde{t}_{13->12,17}$, $\Delta \tilde{t}_{13->14,17}$, $\Delta \tilde{t}_{12->14,17}$, $\Delta \tilde{t}_{15->13,18}$, $\Delta \tilde{t}_{14->16,19}$ and $\Delta \tilde{t}_{16->15,20}$.

The graph arc directions complying with the directions of the adjusted time difference are set. For example, the arc between the BS 13 and BS 14 matches the adjusted time difference $\Delta \tilde{t}_{13->14,17}$ of the signal of the BS 13 with respect to the signal of the BS 14 and directs from the BS 13 to the BS 14, respectively.

Figure 6:
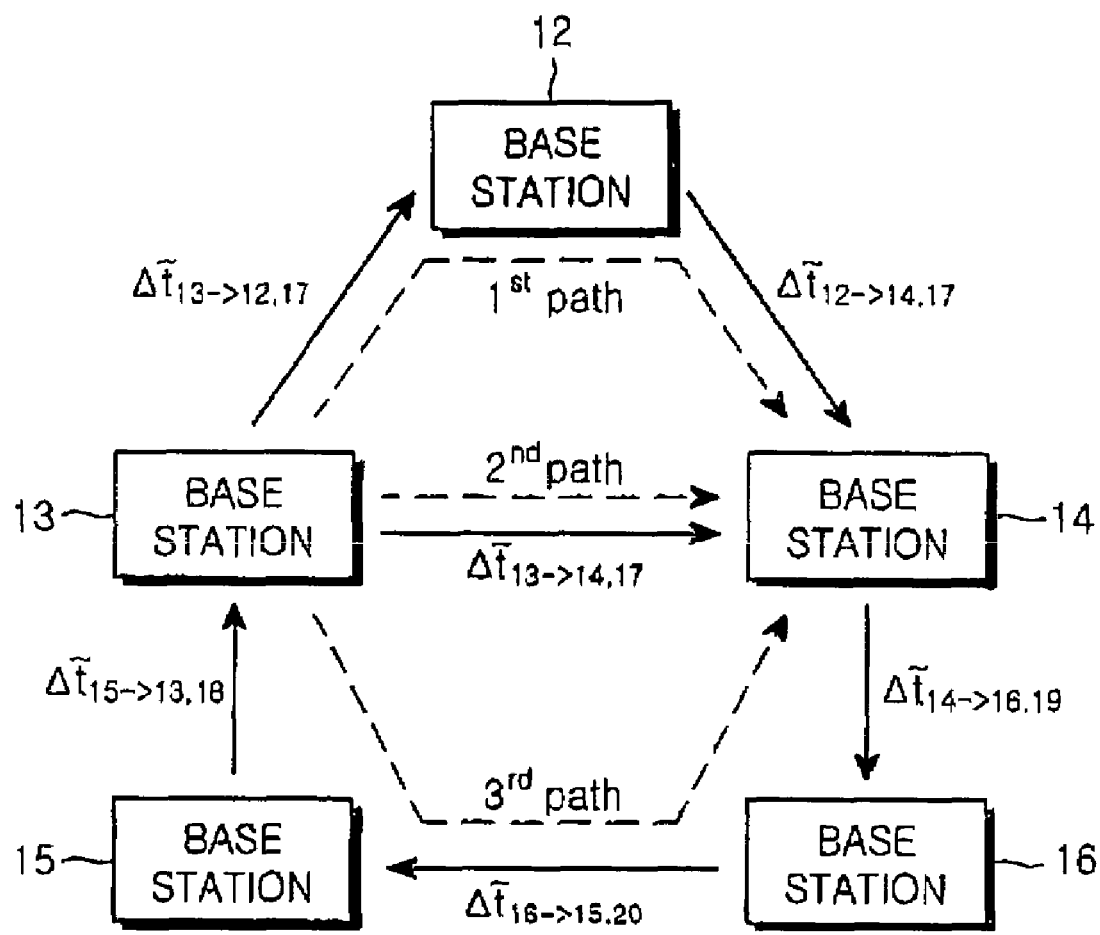
FIG. 6 is a block diagram illustrating an example of the forming of paths from the first base station to the second base station for determining mutual time difference of signals in accordance with an embodiment of the present invention.

Tree estimates $\Delta t_{13->14,17}$, $\Delta t_{13->12,17} + \Delta t_{12->14,17}$ and $-\Delta t_{15->13,18} - \Delta t_{16->15,20} - \Delta t_{14->16,19}$ of the mutual time difference $\Delta \tilde{t}_{13->14}$ correspond to three paths of the graph from the BS 13 to the BS 14 depicted in FIG. 6.

The three paths depicted in FIG. 6 are the set of all possible paths from the BS 13 to the BS 14.

The vertex of each path is a part of base stations, which are the graph vertexes. The first vertex of each path is the BS 13 and the last vertex is the BS 14. The second vertex of the first path is the BS 12; adjacent to the first vertex being the BS 13. The second vertex of the third path is the BS 15; adjacent to the first vertex being the BS 13. The third vertex of the third path is the BS 16; adjacent to the second vertex of the third path being the BS 15.

The adjacent base stations are base stations for which the adjusted time difference of their signals has been obtained. For instance, the BS 15 and the BS 16 are adjacent, since the adjusted time difference $\Delta t_{16->15,20}$ of their signals has been obtained.

The direction of each path is defined from the BS 13 to the BS 14.

Six adjusted time differences have been obtained. Thus, the digits from 1 to 6 number these adjusted time differences by the following equation 5.

$$\Delta t_1 = \Delta \tilde{t}_{13->12,17},$$

$$\Delta t_2 = \Delta \tilde{t}_{13->14,17},$$

$$\Delta t_3 = \Delta \tilde{t}_{12->14,17},$$

$$\Delta t_4 = \Delta \tilde{t}_{15->13,18},$$

$$\Delta t_5 = \Delta \tilde{t}_{14->16,19}, \text{ and}$$

$$\Delta t_6 = \Delta \tilde{t}_{16->15,20}. \quad \text{Equation 5}$$

The terms of the vector of the adjusted time differences and the vector of the adjusted time difference accuracies are here introduced.

The vector of the adjusted time differences $\Delta \vec{t}$ having the length of six, being number of the obtained adjusted time differences, means a vector expressed by the following equation 6.

$$\Delta \vec{t} = \begin{bmatrix} \Delta t_1 \\ \Delta t_2 \\ \Delta t_3 \\ \Delta t_4 \\ \Delta t_5 \\ \Delta t_6 \end{bmatrix} = \begin{bmatrix} \Delta \tilde{t}_{13 \to 12,17} \\ \Delta \tilde{t}_{13 \to 14,17} \\ \Delta \tilde{t}_{12 \to 14,17} \\ \Delta \tilde{t}_{15 \to 13,18} \\ \Delta \tilde{t}_{14 \to 16,19} \\ \Delta \tilde{t}_{16 \to 15,20} \end{bmatrix} \quad \text{Equation 6}$$

In equation 6, p-th element $\Delta t_p$ of the vector $\Delta \vec{t}$, where p gets the values from 1 to 6, equals to the p-th adjusted time difference of the signals of the base stations.

The vector of the adjusted time difference accuracies $\vec{\sigma}$ having the length of six, being number of the obtained adjusted time differences, refers to a vector expressed by the following equation 7.

$$\vec{\sigma} = \begin{bmatrix} \sigma_1 \\ \sigma_2 \\ \sigma_3 \\ \sigma_4 \\ \sigma_5 \\ \sigma_6 \end{bmatrix} = \begin{bmatrix} \sigma_{13 \to 12,17} \\ \sigma_{13 \to 14,17} \\ \sigma_{12 \to 14,17} \\ \sigma_{15 \to 13,18} \\ \sigma_{14 \to 16,19} \\ \sigma_{16 \to 15,20} \end{bmatrix} \quad \text{Equation 7}$$

In equation 7, p-th element $\sigma_p$ of the vector $\vec{\sigma}$, where p gets the values from 1 to 6, equals to the accuracy of the p-th adjusted time difference of the base station signals.

The path vector enumerating the adjusted time differences of the base station signals comprising this path is formed for each path from the formed set of all possible paths from the BS 13 to the BS 14.

The length of each path vector of six, being number of the adjusted time differences, is set.

The p-th element of the u-the path vector (where p takes the values within 1-6 and u takes the values from 1 to 3) is equal to 1 if the path has an arc corresponding to the p-th adjusted time difference and the direction of the pass of the arc of the path complies with the direction of the p-th adjusted time difference, where the direction of the p-th adjusted time difference of the $i_p$-th base station with respect to the $j_p$-th base station is defined from the $i_p$-th base station to the $j_p$-th base station; it is equal to −1 if the path has an arc corresponding to the p-th adjusted time difference and the direction of the pass of the arc of the path is reverse to the direction of the p-th adjusted time difference; otherwise it is equal 0.

The above described action results in three path vectors $\vec{B}^1$, $\vec{B}^2$ and $\vec{B}^3$ corresponding to three paths from the BS 13 to the BS 14. These path vectors equal to the following equation 8.

$$\vec{B}^1 = \begin{bmatrix} 1 \\ 0 \\ 1 \\ 0 \\ 0 \\ 0 \end{bmatrix}, \vec{B}^2 = \begin{bmatrix} 0 \\ 1 \\ 0 \\ 0 \\ 0 \\ 0 \end{bmatrix}, \vec{B}^3 = \begin{bmatrix} 0 \\ 0 \\ 0 \\ -1 \\ -1 \\ -1 \end{bmatrix} \quad \text{Equation 8}$$

The metric of the u-th path vector where u takes the values from 1 to 3 is determined by the following equation 9.

$$\sum_{p=1}^{6} |b_p^u| \sigma_p^2 \quad \text{Equation 9}$$

In equation 9, $b_p^u$ is p-th element of the u-th path vector, and $\sigma_p$ is p-th element of the vector $\vec{\sigma}$ of the adjusted time difference accuracies of the base stations.

Thus, the metric of the first path vector $\vec{B}^1$ is $\sigma_1^2 + \sigma_3^2$, the metric of the second path vector $\vec{B}^2$ is $\sigma_2^2$; and the metric of the third path vector $\vec{B}^3$ is $\sigma_4^2 + \sigma_5^2 + \sigma_6^2$.

A group of path vectors is selected for each pair of base stations from the set of all possible path vectors of this pair of base stations, wherein the selected group of the path vectors contains each of the obtained adjusted time differences; wherein the number of applications of each obtained adjusted time difference of the selected group of path vectors must not exceed the number of applications of this adjusted time difference of any other group of path vectors obtained from the set of all possible path vectors, wherein values of path vector metrics of the selected group must not exceed values of path vector metrics of any other path vector group obtained from the set of all possible path vectors.

These three criteria of the path vector group selection will be explained in greater details further.

The selected path vector group of this example complies with the set of all possible path vectors from the BS 13 to the BS 14.

Three estimates of the mutual time difference $\Delta \tilde{t}_{13 \to 14}$ of the signal of the BS 13 with respect to the signal of the BS 14 can be formed using the vector of the adjusted time differences $\Delta \vec{t}$ and three formed path vectors $\vec{B}^1$, $\vec{B}^2$ and $\vec{B}^3$. In this case, the r-th estimate of the mutual time difference $\Delta \tilde{t}_{13 \to 14}$ where r takes the values from 1 to 3 is given by the following equation 10.

$$\sum_{p=1}^{3} b_p^r \Delta t_p \quad \text{Equation 10}$$

In equation 10, $b_p^r$ is the p-th element of the r-th vector of the path $\vec{B}^r$, and $\Delta t_p$ is the p-th adjusted time difference (p-th element of the mutual time difference vector $\Delta \vec{t}$).

An error $\epsilon_r$ of the r-th mutual time difference estimate $\Delta \tilde{t}_{13 \to 14}$ with respect to the true value of the time difference $\Delta t_{13 \to 14}$ of the signal of the BS 13 with respect to the signal of the BS 14 is expressed by the following equation 11.

$$\varepsilon_r = \Delta t_{13->14} - \sum_{p=1}^{3} b_p^r \Delta t_p \qquad \text{Equation 11}$$

The correlation matrix between the estimate errors of the mutual time difference $\Delta \tilde{t}_{13->14}$ obtained by separate path vectors is formed with the use of the vector of accuracies of the adjusted time differences of the signals of the base station $\vec{\sigma}$ and three generated path vectors $\vec{B}^1$, $\vec{B}^2$ and $\vec{B}^3$, and the correlation matrix size is [3×3]. The correlation matrix element having index marks $r_1$ and $r_2$ (where $r_1$ and $r_2$ take the values from 1 to 3) is expressed by the following equation 12.

$$k_{r_1,r_2} = K[\varepsilon_{r_1}, \varepsilon_{r_2}] = \sum_{p=1}^{6} b_p^{r_1} b_p^{r_2} \sigma_p^2 \qquad \text{Equation 12}$$

In equation 12, $K[\varepsilon_{r_1}, \varepsilon_{r_2}]$ is the correlation coefficient between the error $\varepsilon_{r_1}$ of the $r_1$-th estimate of the mutual time difference $\Delta \tilde{t}_{13->14}$ and the error $\varepsilon_{r_2}$ of the $r_2$-th estimate of the mutual time difference $\Delta \tilde{t}_{13->14}$, $b_p^{r_1}$ is the p-th element of the $r_1$-th path vector $\vec{B}^{r_1}$, $b_p^{r_1}$ is the p-th element of the $r_2$-th path vector $\vec{B}^{r_2}$.

The correlation matrix $\hat{K}_{13->14}$ of this example is expressed by the following equation 13.

$$\hat{K}_{13->14} = \begin{bmatrix} \sigma_1^2 + \sigma_3^2 & 0 & 0 \\ 0 & \sigma_2^2 & 0 \\ 0 & 0 & \sigma_4^2 + \sigma_5^2 + \sigma_6^2 \end{bmatrix} \qquad \text{Equation 13}$$

In general, the correlation matrix is non-diagonal.

The matrix $\hat{W}_{13->14}$, being inverse to the obtained correlation matrix $\hat{K}_{13->14}$ is formed. The matrix $\hat{W}_{13->14}$ inverse to the formed correlation matrix $\hat{K}_{13->14}$ of the present example is expressed by the following equation 14.

$$\hat{W}_{13->14} = (\hat{K}_{13->14})^{-1} = \begin{bmatrix} \frac{1}{\sigma_1^2 + \sigma_3^2} & 0 & 0 \\ 0 & \frac{1}{\sigma_2^2} & 0 \\ 0 & 0 & \frac{1}{\sigma_4^2 + \sigma_5^2 + \sigma_6^2} \end{bmatrix} \qquad \text{Equation 14}$$

With the use of the formed path vector group consisting of the path vectors $\vec{B}^1$, $\vec{B}^2$ and $\vec{B}^3$ and the formed matrix $\hat{W}_{13->14}$ inverse to the generated correlation matrix $\hat{K}_{13->14}$, six weights of the adjusted time differences are produced, and the weight of the p-th adjusted time difference $a_p$ (where p takes the values from 1 to 6) may be calculated by the following equation 15.

$$a_p = \frac{\sum_{r_1=1}^{3} \sum_{r_2=1}^{3} w_{r_1,r_2}(b_p^{r_1} + b_p^{r_2})}{2 \sum_{r_1=1}^{3} \sum_{r_2=1}^{3} w_{r_1,r_2}} \qquad \text{Equation 15}$$

In equation 15, $w_{r_1,r_2}$ is an element of the formed matrix $\hat{W}_{13->14}$ with the indices $r_1$ and $r_2$, where $r_1$ and $r_2$ have the values from 1 to 3, $b_p^{r_1}$ is the p-th element of the $r_1$-th path vector $\vec{B}^{r_1}$ and $b_p^{r_2}$ is the p-th element of the $r_2$-th path vector $\vec{B}^{r_2}$.

The weights of the adjusted time differences of the present example equal to those shown in the following equation 16.

$$a_1 = a_3 = \frac{\sigma_2^2(\sigma_4^2 + \sigma_5^2 + \sigma_6^2)}{\sigma_2^2(\sigma_4^2 + \sigma_5^2 + \sigma_6^2) + \sigma_2^2(\sigma_1^2 + \sigma_3^2) + (\sigma_1^2 + \sigma_3^2)(\sigma_4^2 + \sigma_5^2 + \sigma_6^2)},$$

$$a_2 = \frac{(\sigma_1^2 + \sigma_3^2)(\sigma_4^2 + \sigma_5^2 + \sigma_6^2)}{\sigma_2^2(\sigma_4^2 + \sigma_5^2 + \sigma_6^2) + \sigma_2^2(\sigma_1^2 + \sigma_3^2) + (\sigma_1^2 + \sigma_3^2)(\sigma_4^2 + \sigma_5^2 + \sigma_6^2)},$$

$$a_4 = a_5 = a_6 = -\frac{\sigma_2^2(\sigma_1^2 + \sigma_3^2)}{\sigma_2^2(\sigma_4^2 + \sigma_5^2 + \sigma_6^2) + \sigma_2^2(\sigma_1^2 + \sigma_3^2) + (\sigma_1^2 + \sigma_3^2)(\sigma_4^2 + \sigma_5^2 + \sigma_6^2)}$$

Equation 16

The mutual time difference $\Delta \tilde{t}_{13->14}$ of the signal of the BS 13 with respect to the signal of the BS 14 is determined by the following equation 17.

$$\Delta \tilde{t}_{13 \to 14} = \sum_{p=1}^{6} a_p \Delta t_p \qquad \text{Equation 17}$$

That is, it is determined as the weighted sum of all adjusted time differences $\Delta t_p$ of the signals of the base stations, wherein the weights $a_p$ of the adjusted time differences of the signals of the base stations, where p has values from 1 to 6, are used as weights.

The radio communication cellular system comprising the base station controllers, base stations, location measurement units and a mobile user location center, which can practice the embodiment of the present invention as described above, will now be discussed, wherein each base station is controlled by one base station controller, each location measurement unit receives signals of at least two base stations; and a signal of each base station is received by at least one location measurement unit.

The base stations, base station controllers and the mobile user location center can be embodied in a manner described in Patent WO #99/57826 titled "Method Of Synchronization Of A Base Station Network", 4 May 1998, Int. Cl. H 04 J 3/06, H 04 B 7/26, the contents of which is incorporated herein by reference.

Below is the brief description of units to include in the listed components of the cellular radio communication network to embody the method of mutual time difference determination of base station signals in a cellular communication system in accordance with an embodiment of the present invention.

Each base station transmits a signal being its group signal.

Each location measurement unit measures sequentially the time difference of signals of at least two base stations, which are signals to be received by the location measurement unit, these time difference measurements are averaged, thus obtaining the averaged measured time difference of signals of the base stations. The accuracy of the averaged measured time difference of signals of the base stations is determined. The averaged measured time differences and their accuracies are transmitted from each location measurement unit to one of the base stations. The signals are received by the location measurement unit, and then to the base station controller controlling the base station.

Figure 7:
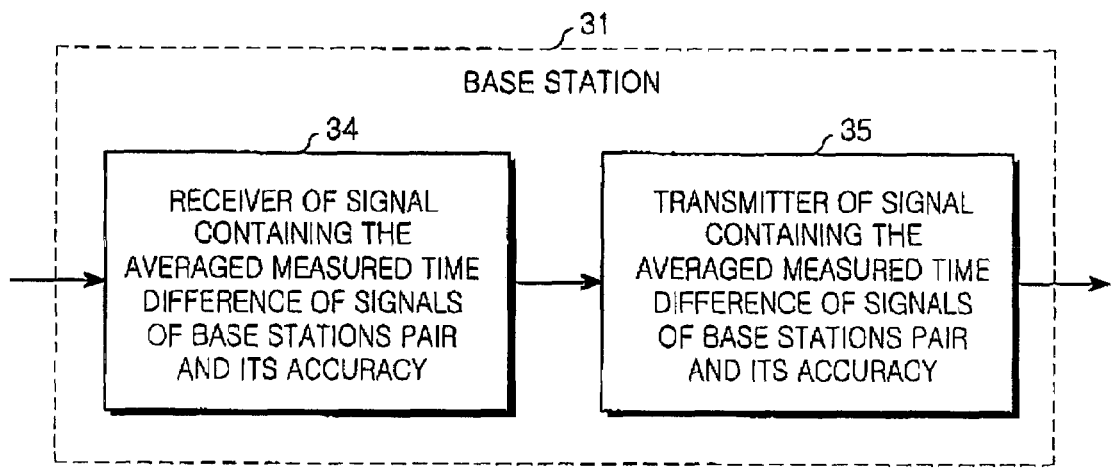
FIG. 7 is a flow diagram illustrating an example of a base station in accordance with an embodiment of the present invention.

Referring to FIG. 7, the BS 31 should comprise at least a receiver 34 of a signal containing the averaged measured time difference of signals of a base station pair and its accuracy (hereinafter referred to as receiver 34), a transmitter 35 of a signal containing the averaged measured time difference of signals of a base stations pair and its accuracy (hereinafter referred to as transmitter 35).

Figure 8:
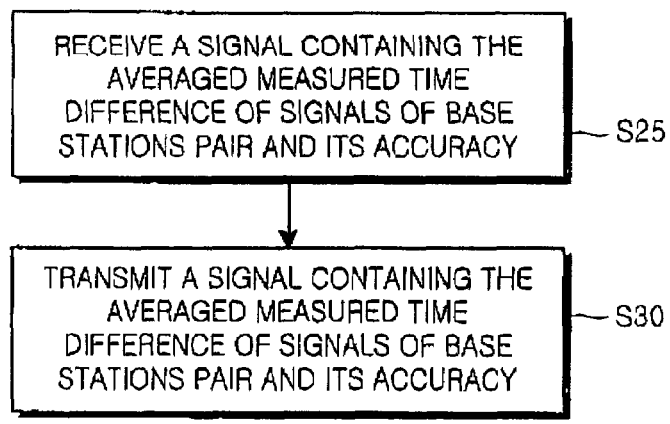
FIG. 8 is a flow diagram illustrating an example of the base station operation in accordance with an embodiment of the present invention.

With reference to FIG. 8, the BS 31 executes the following steps.

In step S25, the receiver 34 receives a signal, containing the averaged measured time difference of signals of a base station pair and its accuracy, transmitted from the LMU 30. In step S30, the transmitter 35 transmits a signal containing the averaged measured time difference of signals of a base station pair and its accuracy to the BSC 32.

Figure 9:
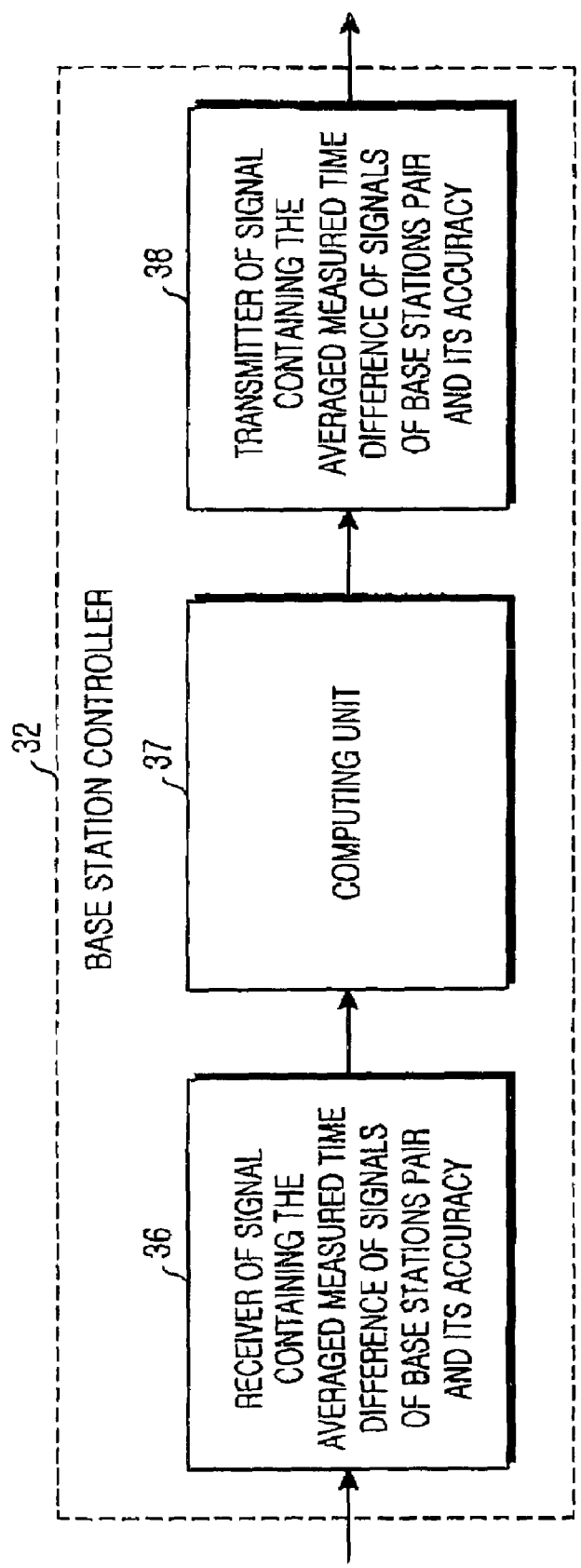
FIG. 9 is a flow diagram illustrating an example of a method of operation for the base station controller in accordance with an embodiment of the present invention.

Referring to FIG. 9, the BSC 32 should comprise at least a receiver 36 of a signal containing the averaged measured time difference of signals of a base stations pair and its accuracy, a computing unit 37 and a transmitter 38 of a signal containing the adjusted time difference of signals of a base station pair and its accuracy.

Figure 10:
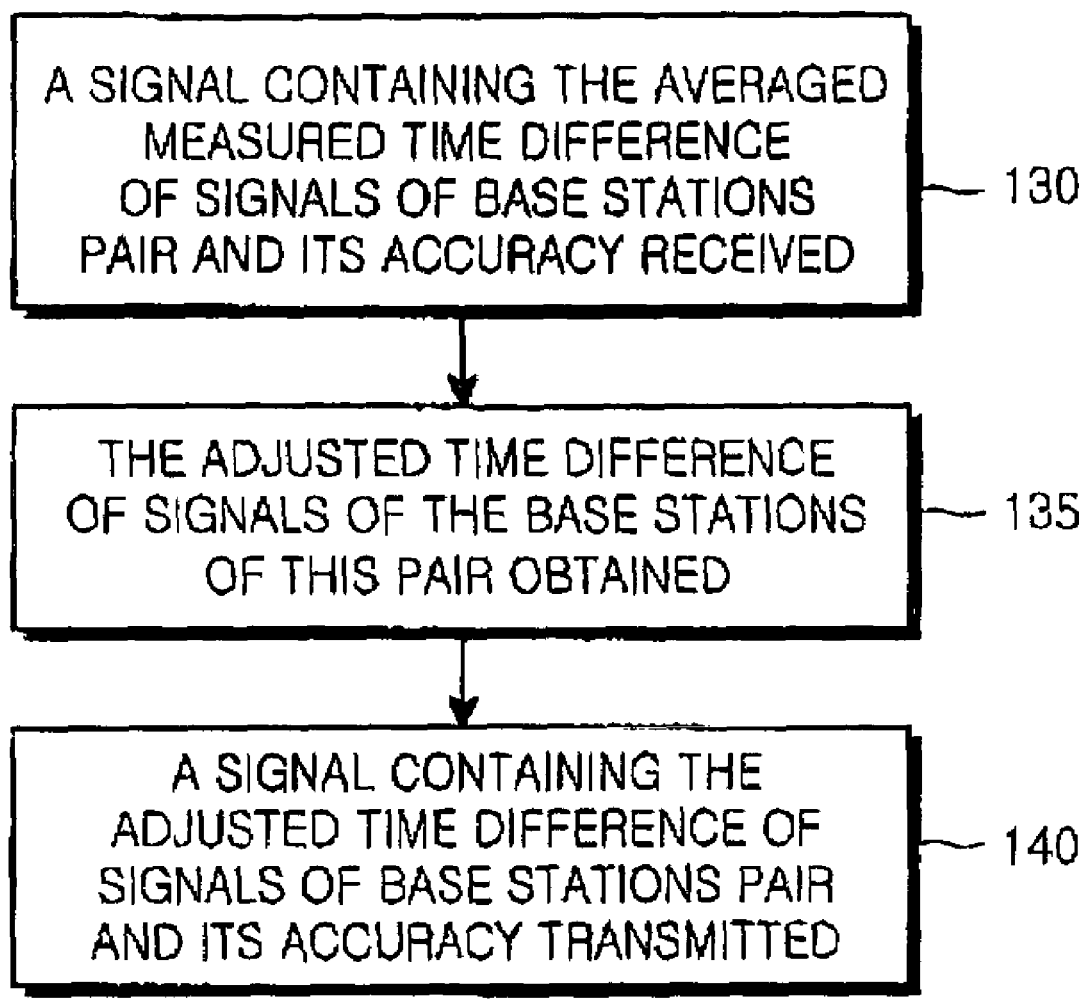
FIG. 10 is a flow diagram illustrating another example of a method of operation for the base station controller in accordance with an embodiment of the present invention.

As shown in FIG. 10, the following operations are performed using the BSC 32. In step 130, the receiver 36 receives a signal containing the averaged measured time difference of signals of a base station pair and its accuracy transmitted by the BS 31. In step 135, the computing unit 37 subtracts the known value of the delay difference at the line of sight signal propagation from the first BS and second BS of the pair to the location measurement unit where this averaged measured time difference has been obtained from the averaged measured time difference signals of each pair of base stations, thus obtaining the adjusted time difference of signals of this base stations pair. In step 140, the transmitter 38 transmits a signal containing the adjusted time difference of the base stations pair and its accuracy to the MULC 33.

Figure 11:
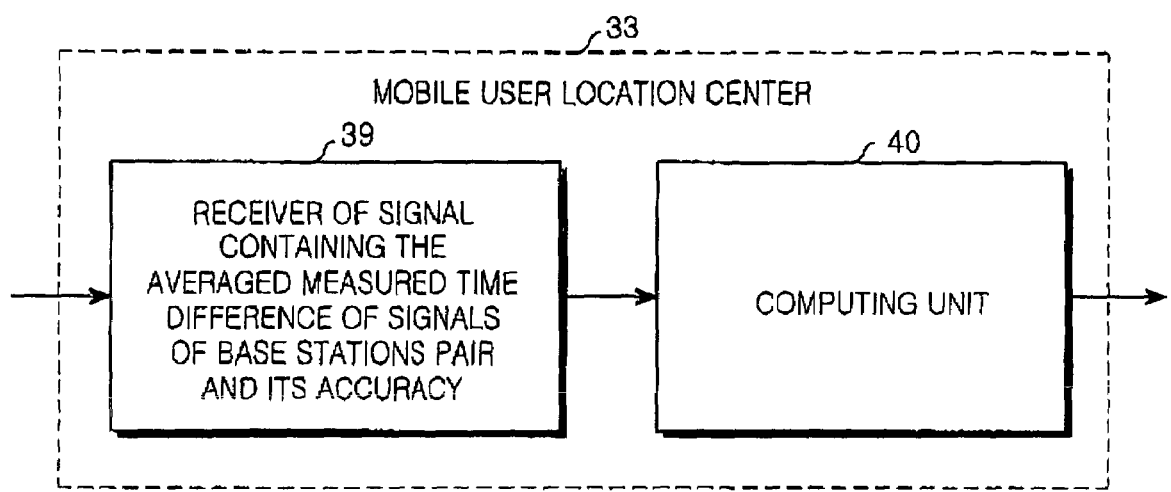
FIG. 11 is a flow diagram illustrating an example of a method of operation for the mobile user location center in accordance with an embodiment of the present invention.

Referring to FIG. 11, the MULC 33 comprises at least a receiver 39 of a signal containing the adjusted time difference of signals of the base stations pair and its accuracy (hereinafter referred to as the receiver 39) and a computing unit 40.

Figure 12:
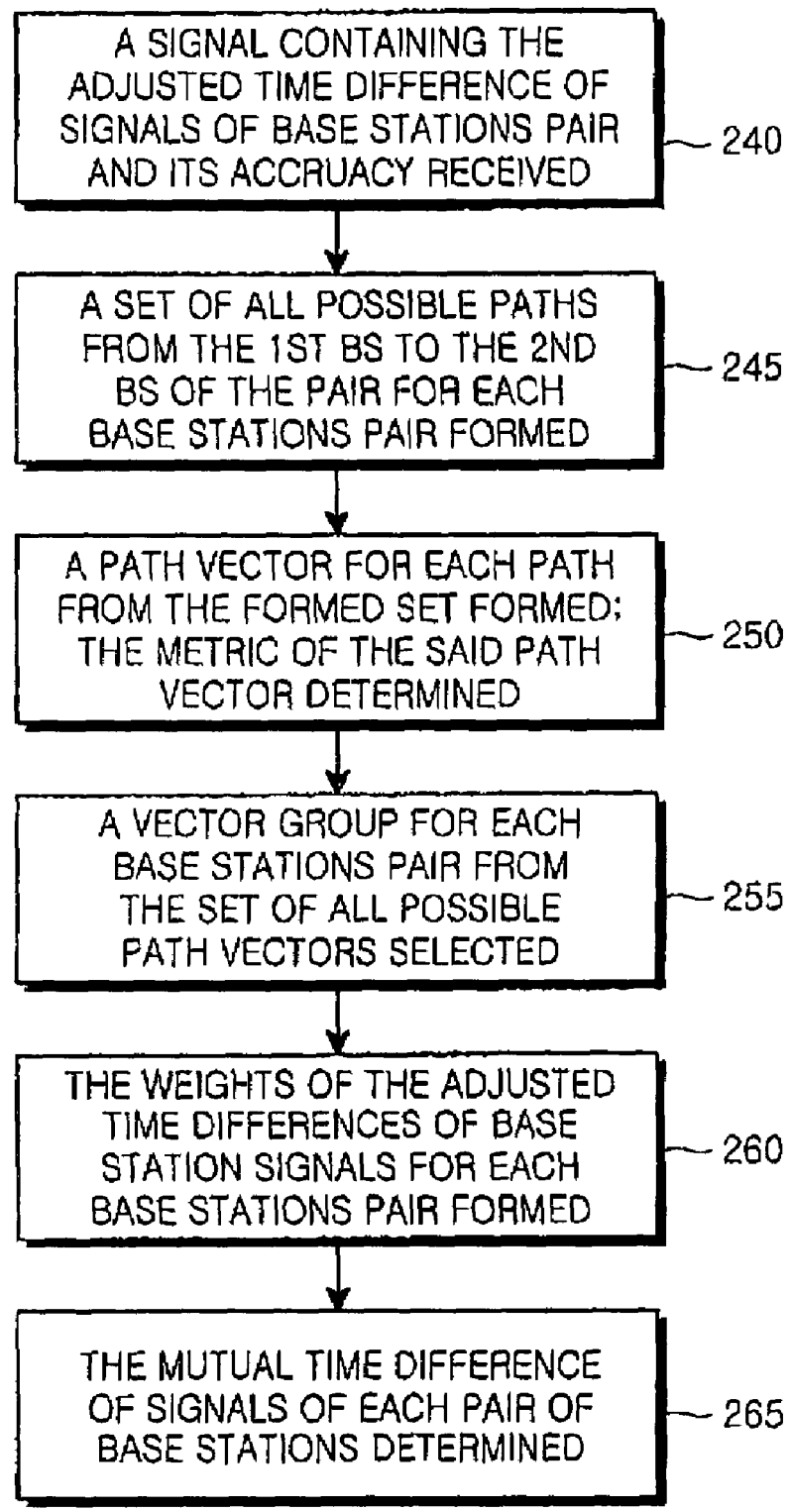
FIG. 12 is a flow diagram illustrating an example of a method for performing a mobile user location procedure in accordance with an embodiment of the present invention.

The following steps are performed by the mobile user location center as shown in FIG. 12. In step 240, the receiver 39 receives a signal containing the adjusted time difference of signals of the base station pair and its accuracy transmitted by the BSC 32.

In step 245, the computing unit 40 forms a set of all possible paths from the first BS to the second BS for each pair of base stations. Said all possible paths refer to paths between base stations adjacent to a terminal which is an object of the measurement, and the paths between the base stations adjacent to the terminal include non-line-of-sight multipaths. Assume, the radio communication cellular system consists of L base stations. All base stations are assumed to be numbered from 1 through L.

Below is the explanation of the term "adjacent base station". The BS i is adjacent to the BS j, (wherein i and j takes the values from 1 to L) if at least one adjusted time difference of a signal of the BS i is obtained with respect to a signal of the BS j. If p adjusted time differences of a signal of the BS i is obtained with respect to a signal of the BS j, these base stations are adjacent to each other p times.

The set of adjacent base stations is formed for each base station in the following manner. Assume, the number of the base stations adjacent to the BS i is $Q_i$, where i takes the values from 1 to L. The set of base stations adjacent to the BS i is defined by the following equation 18.

$$\hat{D}_i = \{d_1^i, d_2^i, \ldots, d_{Q_i}^i\} \qquad \text{Equation 18}$$

In equation 18, $q_i$-th element $d_{q_i}^i$ of the set $\hat{D}_i$, where $q_i$ takes the values from 1 to $Q_i$, is the number of the $q_i$-th base station adjacent to the BS i. If any base station is an adjacent base station to the BS i p times, its number is included to the $\hat{D}_i$ set p times. L sets $\hat{D}_i$ of the adjacent base stations are formed.

The set of all possible paths from the first BS to the second BS of the pair is formed for each pair of base stations in the following manner.

Assume, all paths from the BS $i_m$ to the BS $j_m$ have to be determined, where $i_m$ and $j_m$ have the values from 1 to L. This is performed by the sequential selection of the following: all base stations adjacent to the BS $i_m$, all base stations adjacent to the base stations which are adjacent to the BS $i_m$, all base station adjacent to the base stations of adjacent base stations which are adjacent to the BS $i_m$, etc.

The sequential selection is performed: the selection sequence to be determined uniquely by sequences of the numbers of base station $\{d_0^i, d_1^i, \ldots, d_{Q_i}^i\}$ of the formed sets $\hat{D}_i$ of the adjacent base stations; each path to be updated with those numbers of base stations, which are not found previously in the sequential selection. In general, the lengths of the resulting paths are different and the length of each path is less or equal to number of the base stations L. Each path is a sequence of the numbers of the base stations in pass during the sequential selection. The first element of the sequence of base station numbers of each formed path is $i_m$. The last element of the sequence of base station numbers of each formed path can be either $j_m$ or not. Those formed paths which end at the BS $j_m$ are kept, i.e. those formed paths with the last element of the sequence of base station numbers of $j_m$ are kept. Number of the paths kept is assumed to be U. They form a set of all possible paths from the BS $i_m$ to the BS $j_m$. They are numbered with the numbers from 1 to U.

In step 250, a path vector listing the adjusted time differences of signals of base stations included into this path is formed for each path of each formed set; the metric of the said path vector is determined.

Assume, P adjusted time differences of the base station signals are obtained. They are numbered by the numbers from 1 to P. The terms of an adjusted time difference vector and an adjusted time difference accuracy vector are introduced.

The adjusted time difference vector $\vec{\Delta t}$ with the length of P (number of the obtained adjusted time differences) is expressed by the following equation 19.

$$\Delta \vec{t} = \begin{bmatrix} \Delta t_1 \\ \Delta t_2 \\ \vdots \\ \Delta t_P \end{bmatrix} \qquad \text{Equation 19}$$

In equation 19, the p-th element $\Delta t_p$ of the vector $\Delta \vec{t}$ (where p takes the values from 1 to P) equals to the p-th adjusted time difference of the base station signals.

The vector of the adjusted time difference accuracies $\vec{\sigma}$ with the length of P (number of the obtained adjusted time differences) is a vector expressed by the following equation 20.

$$\vec{\sigma} = \begin{bmatrix} \sigma_1 \\ \sigma_2 \\ \vdots \\ \sigma_P \end{bmatrix} \qquad \text{Equation 20}$$

In equation 20, the p-th element $\sigma_p$ of the vector $\vec{\sigma}$ (where p takes the values from 1 to P) equals to the accuracy of the p-th adjusted time difference of the base station signals.

The path vector enumerating the adjusted time differences of the signals of the base stations comprised to this path is formed for each path of the generated set of all possible paths.

To illustrate, consider this operation for the set of all possible paths from the BS $i_m$ to the BS $j_m$.

The length of each path vector is set to be P, number of the adjusted time differences.

The p-th element of the u-th path vector (where p takes the values from 1 to P and u takes the values from 1 to U) is equal to 1, if this path has an arc corresponding to the p-th adjusted time difference and the direction of the pass of the arc of the path complies with the direction of the p-th adjusted time difference; it is equal to −1, if the path has an arc corresponding to the p-th adjusted time difference and the direction of the pass of the arc of the path is reverse to the direction of the p-th adjusted time difference; and otherwise it is equal 0.

U vectors of the $\vec{B}^1, \ldots, \vec{B}^U$ paths from the BS $i_m$ to the BS $j_m$ are obtained. The formed set of the vectors of all possible paths from the BS $i_m$ to the BS $j_m$ is generally redundant.

The metric of each formed path vector is determined. For instance, the metric of the u-th vector $\vec{B}^u$ of the set of vectors of all possible paths from the BS $i_m$ to the BS $j_m$ is determined in the manner expressed by the following equation 21.

$$\sum_{p=1}^{P} |b_p^u| \sigma_p^2 \qquad \text{Equation 21}$$

In equation 21, $b_p^u$ is the p-th element of the u-th vector of the path $\vec{B}^u$ from the BS $i_m$ to the BS $j_m$, and $\sigma_p$ is the p-th element of the vector $\vec{\sigma}$ of the adjusted time difference accuracies.

In step 255, a group of path vectors is selected for each pair of base stations from the set of all possible path vectors of this pair of base stations, wherein the selected group of the path vectors contains each of the obtained adjusted time differences; wherein number of applications of each obtained adjusted time difference of the selected group of path vectors must not exceed the number of applications of this adjusted time difference of any other group of path vectors obtained from the set of all possible path vectors, wherein values of path vector metrics of the selected group must not exceed values of path vector metrics of any other path vector group obtained from the set of all possible path vectors.

This operation is demonstrated by an example of the selection of a group of the path vectors from the set of all possible path vectors from the BS $i_m$ to the BS $j_m$.

The set of all possible path vectors from the BS $i_m$ to the BS $j_m$ is sorted in order of increasing path vector metric. The sorting results in the obtaining of U vectors of the paths $\vec{B}^1, \ldots, \vec{B}^U$ where the vector of the path $\vec{B}^1$ has the minimum metric and the vector of the path $\vec{B}^U$ has the maximum metric.

The vector of the adjusted time differences $\vec{C}$ of the $\vec{B}^u$ path vector is defined. The $\vec{C}$ vector length is P, and the p-th element of the vector $\vec{C}$ equals to equation 22 below.

$$c_p = |b_p^u| \qquad \text{Equation 22}$$

That is to say, the element equals to the absolute value of the p-th element of the vector of the path $\vec{B}^u$.

The adjusted time difference vector $\vec{C}$ of the $\vec{B}^{u_1}$, $\vec{B}^{u_2}, \ldots$ path vectors is defined. The length of the vector $\vec{C}$ is P, and the p-th element of the vector $\vec{C}$ is determined by the manner below: $c_p=0$, if $b_p^{u_1}=0$, $b_p^{u_2}=0, \ldots$, otherwise $c_p=1$.

To select the path vector group from the set of all possible path vectors from the BS $i_m$ to the BS $j_m$, $\vec{B}^2, \ldots, \vec{B}^U$ are tried to be removed sequentially from the path vector set at U−1 steps. In this case the vector of the path $\vec{B}^u$ is attempted to be removed at the u-th step (where u takes the values from 2 to U) in the following manner:

the vector $\vec{C}$ is formed as a vector of the adjusted time differences of the vectors of the paths $\vec{B}^{u-1}, \vec{B}^{u-2}, \ldots, \vec{B}^1$,
if $b_p^u=0$ for all p (where p takes the values from 1 to p) for which $c_p=0$, the vector of the path $\vec{B}^u$ can be removed, otherwise, it cannot be removed.

Assume, we have R path vectors from the BS $i_m$ to the BS $j_m$. They form the selected group of the path vectors $\vec{B}^1, \ldots, \vec{B}^R$ from the BS $i_m$ to the BS $j_m$ which will be further used.

In step 260, weights of the adjusted time differences of signals of base stations are formed for each pair of base stations using the selected group of path vectors of these base stations and the obtained accuracies of the adjusted time differences of signals of the base stations. That is, for said all paths, weights are provided according to errors of the measured mutual time differences. This situation is explained by the forming of the weights of the adjusted time difference of BS $i_m$ and BS $j_m$ signals.

The correlation matrix of errors of mutual time difference of the signal of the BS $i_m$ with respect to the signal of the BS $j_m$ obtained by separate path vectors is formed using the accuracy vector $\vec{\sigma}$ of the adjusted time differences of the base station signals and the selected path vectors group $\vec{B}^1, \ldots, \vec{B}^R$.

The correlation matrix size is [R×R]. The correlation matrix element with the indices $r_1$ and $r_2$ (wherein $r_1$ and $r_2$ taking the values within 1–R) is expressed by the following equation 23.

$$k_{r_1, r_2} = K[\varepsilon_{r_1}, \varepsilon_{r_2}] = \sum_{p=1}^{P} b_p^{r_1} b_p^{r_2} \sigma_p^2 \qquad \text{Equation 23}$$

In equation 23, $K[\varepsilon_{r_1}, \varepsilon_{r_2}]$ is the correlation coefficient between the $r_1$-th and $r_2$-th errors of the estimate of the mutual time difference of the signal of the BS $i_m$ with respect to the signal of the BS $j_m$, $b_p^{r_1}$ is the p-th element of the $r_1$-th path vector $\vec{B}^{r_1}$, and $b_p^{r_2}$ is the p-th element of the $r_2$-th path vector $\vec{B}^{r_2}$.

The matrix $\hat{W}$, inverse to the formed correlation matrix $\hat{K}$ is produced.

P weights of the adjusted time differences are generated using the selected group of the path vectors consisting of the path vectors $\vec{B}^1, \ldots, \vec{B}^R$ and using the generated matrix $\hat{W}$, inverse to the formed correlation matrix $\hat{K}$, the weight of the p-th adjusted time difference $a_p$ (wherein p taking the values from 1 to P) being calculated by the following equation 24.

$$a_p = \frac{\sum_{r_1=1}^{R} \sum_{r_2=1}^{R} w_{r_1, r_2} (b_p^{r_1} + b_p^{r_2})}{2 \sum_{r_1=1}^{R} \sum_{r_2=1}^{R} w_{r_1, r_2}} \qquad \text{Equation 24}$$

In equation 24, $w_{r_1, r_2}$ is an element of the formed matrix $\hat{W}$ with the indices $r_1$ and $r_2$, where $r_1$ and $r_2$ take the values from 1 to R, $b_p^{r_1}$ is the p-th element of the $r_1$-th path vector $\vec{B}^{r_1}$, and $b_p^{r_2}$ is the p-th element of the $r_2$-th path vector $\vec{B}^{r_2}$.

In step 265, a mutual time difference of signals of each pair of base stations is determined as a weighted sum of all adjusted time differences of signals of base stations, wherein the weights of the adjusted time difference of signals of the base stations formed for the pair of base stations are used as weights.

For example, the mutual time difference $\Delta \tilde{t}_{i_m \to j_m}$ of the signal of the BS $i_m$ with respect to the signal of the BS $j_m$ is determined by the following equation 25.

$$\Delta \tilde{t}_{i_m \to j_m} = \sum_{p=1}^{P} a_p \Delta t_p \qquad \text{Equation 25}$$

That is to say, it is determined as the weighted sum of all adjusted time differences $\Delta t_p$ of the base station signals wherein the weights $a_p$ of the adjusted time differences of the base station signals formed for the BS $i_m$ and BS $j_m$, where p takes the values within 1 ... P, are used as weights.

Figure 13:
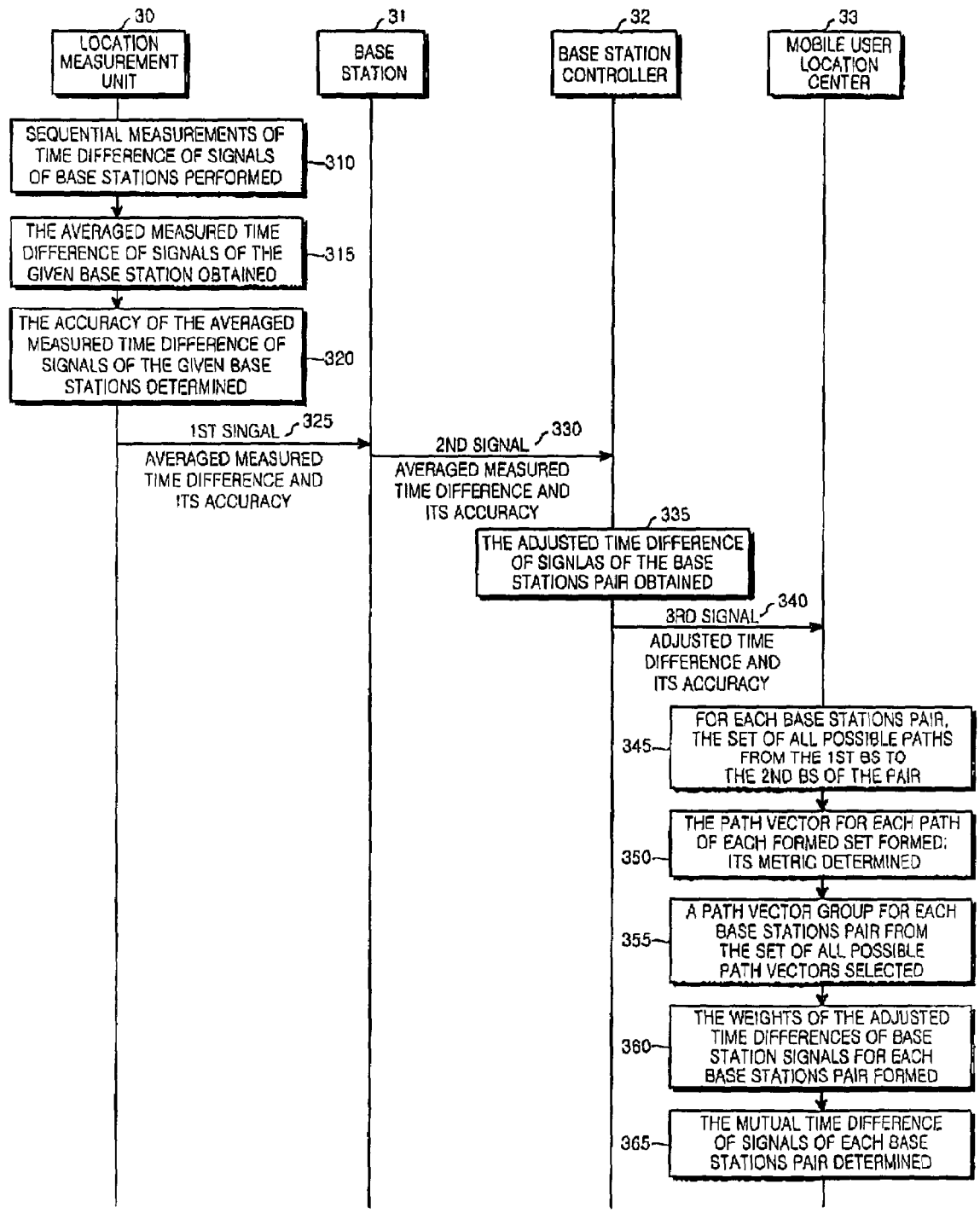
FIG. 13 is a flow diagram illustrating an example of a method for performing accurate base station location determination in accordance with an embodiment of the present invention.

Hereinafter, the joint operation of the cellular system components for the implementation of the claimed invention will be described with reference to FIG. 13. FIG. 13 shows the LMU 30, BS 31, BSC 32 and the MULC 33.

In step 310, the LMU 30 sequentially measures the time difference of signals of at least two received base stations. In step 315, the LMU 30 averages these time difference measurements, thereby obtaining the averaged measured time difference of signals of these base stations. In step 320, the LMU 30 determines the accuracy of the averaged measured time difference of signals of these base stations. In step 325, the LMU transmits the first signal containing the averaged measured time difference of the signals of the base stations pair and its accuracy to the BS 31. In step 330, the BS 31 transmits the second signal containing the averaged measured time difference of the signals of the base stations pair and its accuracy to the BSC 32.

In step 335, in the BSC 32, the known value of the delay difference at the line of sight signal propagation from the first BS and second BS of each pair of the base stations to the location measurement unit, where this averaged time difference is obtained, is subtracted from the averaged measured time difference of this pair of the base stations, thus obtaining the adjusted time difference of the signals of this base stations pair.

In step 340, the BSC 32 transmits the third signal containing the adjusted time difference of each base stations pair and its accuracy to the MULC 33.

In step 345, the MULC 33 forms a set of all possible paths from the first BS to the second BS of the pair for each base stations pair. Said all possible paths refer to paths between base stations adjacent to a terminal which is an object of the measurement, and the paths between the base stations adjacent to the terminal include non-line-of-sight multipaths.

In step 350, the MULC 33 forms a path vector enumerating the adjusted time differences of the base station signals included into this path and determines its metric for each path of each generated set.

In step 355, the MULC 33 selects a group of path vectors for each pair of base stations from the set of all possible path vectors of this pair of base stations, wherein the selected group of the path vectors contains each of the obtained adjusted time differences; wherein number of applications of each obtained adjusted time difference of the selected group of path vectors must not exceed number of applications of this adjusted time difference of any other group of path vectors obtained from the set of all possible path vectors, wherein values of path vector metrics of the selected group must not exceed values of path vector metrics of any other path vector group obtained from the set of all possible path vectors.

In step 360, the MULC 33 forms weights of the adjusted time differences of signals of base stations for each pair of base stations using the selected group of path vectors of these base stations and the obtained accuracies of the adjusted time differences of signals of the base stations. For said all paths, weights are provided according to errors of the measured mutual time differences.

In step 365, the MULC 33 determines a mutual time difference of signals of each pair of base stations as a weighted sum of all adjusted time differences of signals of base stations, wherein the weights of the adjusted time difference of signals of the base stations formed for the pair of base stations are used as weights.

The claimed method of mutual time difference determination of base station signals in a cellular communication system has a number advantages compared to prior inventions known to those skilled in the art. First, the claimed method enables the determination of the mutual time difference of signals of any pair of base stations regardless of the availability of the direct measurement of the adjusted time difference of signals of this pair of base stations. Secondly, the claimed method enables improved accuracy in determining the mutual time differences of base station signals. These advantages are achieved due to joint statistical processing of all adjusted time differences of base station signals.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for determining a mutual time difference of signals transmitted between a first base station and a second base station in an asynchronous code division multiplexing access (CDMA) system, the asynchronous CDMA system having at least one other base station and forming at least three pairs of two adjacent base stations, the method comprising the steps of:
   (a) for each pair of the at least three pairs of two adjacent base stations, measuring time difference of signals transmitted between two adjacent base stations of said pair, obtaining an adjusted time difference corresponding to said pair, and obtaining an accuracy of the adjusted time difference;
   (b) determining a set of all possible paths between said first base station and said second base station, wherein each path of said set of all possible paths comprises at least one pair of two adjacent base stations; and
   (c) providing weights to the obtained adjusted time differences corresponding to pair(s) of two adjacent base stations included in each path of said set of all possible paths.

2. The method as claimed in claim 1, wherein, for each pair of the at least three pairs of two adjacent base stations, each of the signals transmitted between two adjacent base stations of said pair is transmitted through a common pilot channel.

3. The method as claimed in claim 1, wherein, for each pair of the at least three pairs of two adjacent base stations, step (a) comprises the substeps of:
   sequentially measuring the time difference of the signals when received; and
   averaging measurements of the time difference, thereby obtaining an average of the measured time difference, the average of the measured time difference being used as a basis to determine the adjusted time difference corresponding to said pair.

4. The method as claimed in claim 3, wherein, for each pair of the at least three pairs of two adjacent base stations, step (a) further comprises a substep of determining the accuracy of the adjusted time difference corresponding to said pair by means of a signal to noise ratio, so as to measure an error between a measured time difference and the adjusted time difference.

5. The method as claimed in claim 3, wherein, for each pair of the at least three pairs of two adjacent base stations, the adjusted time difference corresponding to said pair is compensated by subtracting a difference of delays at line of sight signal from the adjusted time difference, said line of sight signal propagating between two adjacent base stations of said pair.

6. The method as claimed in claim 5, wherein, for each pair of the at least three pairs of two adjacent base stations, the difference of delays at line of sight signal is obtained by equations, $$\tau_{i->k} = \frac{\sqrt{(x_i - x_k)^2 + (y_i - y_k)^2 + (z_i - z_k)^2}}{c} \text{ and}$$

$$\tau_{j->k} = \frac{\sqrt{(x_j - x_k)^2 + (y_j - y_k)^2 + (z_j - z_k)^2}}{c},$$

in which
   c is the light speed, a first base station of said pair coordinates with $x_i$, $y_i$, $z_i$, a second base station of said pair coordinates with $x_j$, $y_j$, $z_j$, and a location measurement unit coordinates with $x_k$, $y_k$, $z_k$.

7. The method as claimed in claim 1, wherein steps (b) and (C) comprises the substeps of:
   (1) receiving the adjusted time differences obtained in step (a) and the accuracies of the adjusted time differences obtained in step (a);
   (2) forming the set of all possible paths between said first base station and said second base station;
   (3) for each path of said set of all possible paths, forming a path vector listing the obtained adjusted time difference(s) corresponding to pair(s) of two adjacent base stations included in this path and determining a metric of the path vector;
   (4) selecting a group of path vectors from all path vectors formed in step (3), wherein the selected group of path vectors contains each of the obtained adjusted time differences;
   (5) forming weights for each of the obtained adjusted time differences using the selected group of path vectors and the obtained accuracies of the obtained adjusted time differences; and
   (6) determining the mutual time difference as a weighted sum of all of the obtained adjusted time differences, wherein the weights of the obtained adjusted time differences are used as weights.

8. The method as claimed in claim 7, wherein, in step (4), a number of applications of each obtained adjusted time difference of the selected group of path vectors does not exceed a number of applications of each obtained adjusted time difference of any other group of path vectors obtained from the set of all possible path vectors, and values of path vector metrics of the selected group do not exceed values of path vector metrics of any other path vector group obtained from the set of all possible path vectors.

9. The method as claimed in claim 1, wherein, for each pair of the at least three pairs of two adjacent base stations, the adjusted time difference corresponding to said pair and the accuracy of the adjusted time difference are transmitted through one of two adjacent base stations of said pair to a base station controller.

10. The method as claimed in claim 1, wherein, for each pair of the at least three pairs of two adjacent base stations, the adjusted time difference corresponding to said pair and the accuracy of the adjusted time difference are transmitted from the base station controller to a mobile user location center for calculating the mutual time difference of the signals.

11. The method as claimed in claim 1, wherein said first base station and said second base station are adjacent to a terminal which is an object of the measurement.

12. The method as claimed in claim 11, wherein at least one path of said set of all possible paths between said first base station and said second base station includes non-line-of-sight multipaths.

13. The method as claimed in claim 1, wherein, for paths of said set of all possible paths, the weights are provided according to errors of the obtained adjusted time differences corresponding to said paths.

14. A timing system for determining a mutual time difference of signals transmitted between a first base station and a second base station in an asynchronous code division multiplexing access (CDMA) system, the asynchronous CDMA system having at least one other base station and forming at least three pairs of two adjacent base stations, the timing system comprising:
  a plurality of location measurement units, each for measuring time difference of signals transmitted between at least one pair of two adjacent base stations, obtaining an adjusted time difference corresponding to said at least one pair, and obtaining an accuracy of the adjusted time difference;
  a mobile user location center for receiving the adjusted time differences, each obtained by one of the plurality of the location measurement units, determining a set of all possible paths between said first base station and said second station wherein each path of said set of all possible paths comprises at least one pair of two adjacent base stations, and providing weights to the adjusted time difference(s) corresponding to pair(s) of two adjacent base stations included in each path of said set of all possible paths.

15. The timing system as claimed in claim 14, wherein, for each pair of the at least three pairs of two adjacent base stations, each of the signals transmitted between two adjacent base stations of said pair is transmitted through a common pilot channel.

16. The timing system as claimed in claim 14, wherein each of the plurality of location measurement units sequentially measures time difference of the signals transmitted between the at least one pair of two adjacent base stations when received, and averages measurements of the time difference, thereby obtaining an average of the measured time difference for the signals, the average of the measured time difference being used as a basis to determine the adjusted time difference corresponding to said at least one pair.

17. The timing system as claimed in claim 16, wherein each of the plurality of location measurement units determines the accuracy of the adjusted time difference by means of a signal to noise ratio, so as to measure an error between the measured time difference and the adjusted time difference.

18. The timing system as claimed in claim 16, wherein each of the plurality of location measurement units compensates the average of the adjusted time difference by subtracting a difference of delays at line of sight signal from the average of the measured mutual time difference, said line of sight signal propagating between two adjacent base stations of said pair.

19. The timing system as claimed in claim 18, wherein the location measurement unit calculates the difference of delays at line of sight signal by means of equations, $$\tau_{i \to k} = \frac{\sqrt{(x_i - x_k)^2 + (y_i - y_k)^2 + (z_i - z_k)^2}}{c} \text{ and}$$

$$\tau_{j \to k} = \frac{\sqrt{(x_j - x_k)^2 + (y_j - y_k)^2 + (z_j - z_k)^2}}{c},$$

n which
  c is the light speed, a first base station of said pair coordinates with $x_i$, $y_i$, $z_i$, a second base station of said pair coordinates with $x_j$, $y_j$, $z_j$, and a location measurement unit coordinates with $x_k$, $y_k$, $z_k$.

20. The timing system as claimed in claim 14, wherein the mobile user location center performs:
  receiving the adjusted time differences obtained in the plurality of location measure units and the accuracies of the adjusted time differences obtained in the plurality of location measure units;
  forming the set of all possible paths between said first station and said second station;
  for each path of said set of all possible paths, forming a path vector listing the obtained adjusted time difference(s) corresponding to pair(s) of two adjacent base stations included in this path and determining a metric of the path vector;
  selecting a group of path vectors from all path vectors already formed, wherein the selected group of path vectors contains each of the obtained adjusted time differences;
  forming weights for each of the obtained adjusted time differences of signals using the selected group of path vectors and the obtained accuracies of the adjusted time differences; and
  determining the mutual time difference as a weighted sum of all the obtained adjusted time differences, wherein the weights of the adjusted time differences are used as weights.

21. The timing system as claimed in claim 20, wherein in selecting a group of path vectors, the mobile user location center prevents a number of applications of each obtained adjusted time difference of the selected group of path vectors from exceeding a number of applications of each obtained adjusted time difference of any other group of path vectors obtained from the set of all possible path vectors, and prevents values of path vector metrics of the selected group from exceeding values of path vector metrics of any other path vector group obtained from the set of all possible path vectors.

22. The timing system as claimed in claim 14, wherein each of the plurality of location measurement units transmits the adjusted time difference and the accuracy of the adjusted time difference through one of two adjacent base stations of said at least one pair corresponding to this location measurement unit to a base station controller.

23. The timing system as claimed in claim 22, wherein the mobile user location center receives the adjusted time difference and the accuracy of the adjusted time difference from the base station controller.

24. The timing system as claimed in claim 14, wherein said first base station and said second base station are adjacent to a terminal which is an object of the measurement.

25. The timing system as claimed in claim 24, wherein at least one path of said set of all possible paths between the said first base station and said second base station includes non-line-of-sight multipaths.

26. The timing system as claimed in claim 14, wherein, for paths of said set of all possible paths, the weights are provided according to errors of the obtained adjusted time differences corresponding to the paths.

* * * * *